(12) United States Patent
Tagami et al.

(10) Patent No.: US 11,694,720 B1
(45) Date of Patent: Jul. 4, 2023

(54) MAGNETIC DISK DEVICE THAT CORRECTS POSITION OF HEAD BY DEMODULATION

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoki Tagami, Yokohama Kanagawa (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/885,310

(22) Filed: Aug. 10, 2022

(30) Foreign Application Priority Data

Mar. 7, 2022 (JP) .................................. 2022-034587

(51) Int. Cl.
| | | |
|---|---|---|
| *G11B 20/10* | (2006.01) | |
| *G11B 20/12* | (2006.01) | |
| *G11B 21/10* | (2006.01) | |
| *G11B 5/012* | (2006.01) | |
| *G11B 5/596* | (2006.01) | |

(52) U.S. Cl.
CPC ........ *G11B 20/10268* (2013.01); *G11B 5/012* (2013.01); *G11B 5/59633* (2013.01); *G11B 20/1217* (2013.01); *G11B 21/106* (2013.01); *G11B 2020/1281* (2013.01)

(58) Field of Classification Search
None
See application file for complete search history.

(56) References Cited

U.S. PATENT DOCUMENTS

| | | |
|---|---|---|
| 9,070,411 B1 | 6/2015 | Ellis et al. |
| 2015/0179198 A1 | 6/2015 | Ong et al. |
| 2020/0286517 A1 | 9/2020 | Tagami |
| 2021/0264942 A1 | 8/2021 | Tagami |
| 2022/0301584 A1 | 9/2022 | Tagami |

FOREIGN PATENT DOCUMENTS

JP 2022-144718 A 10/2022

OTHER PUBLICATIONS

Unpublished U.S. Appl. No. 17/468,413, filed Sep. 7, 2021 (Inventor: Naoki Tagami).

*Primary Examiner* — Craig A. Renner
(74) *Attorney, Agent, or Firm* — Kim & Stewart LLP

(57) ABSTRACT

According to one embodiment, a magnetic disk device includes a disk including a zone servo boundary area including a first area of a first servo frequency, a second area of a second servo frequency, and a third area of the first servo frequency, in a servo area, a head, and a controller demodulating first servo data of the first area to derive a position of the head and demodulating first corrected data of the third area to correct the position of the head. The first area, the second area, and the third area are aligned in order in a traveling direction. The first area and the second area are adjacent to each other in a circumferential direction of the disk. The second area and the third area are adjacent to each other in the circumferential direction.

17 Claims, 23 Drawing Sheets

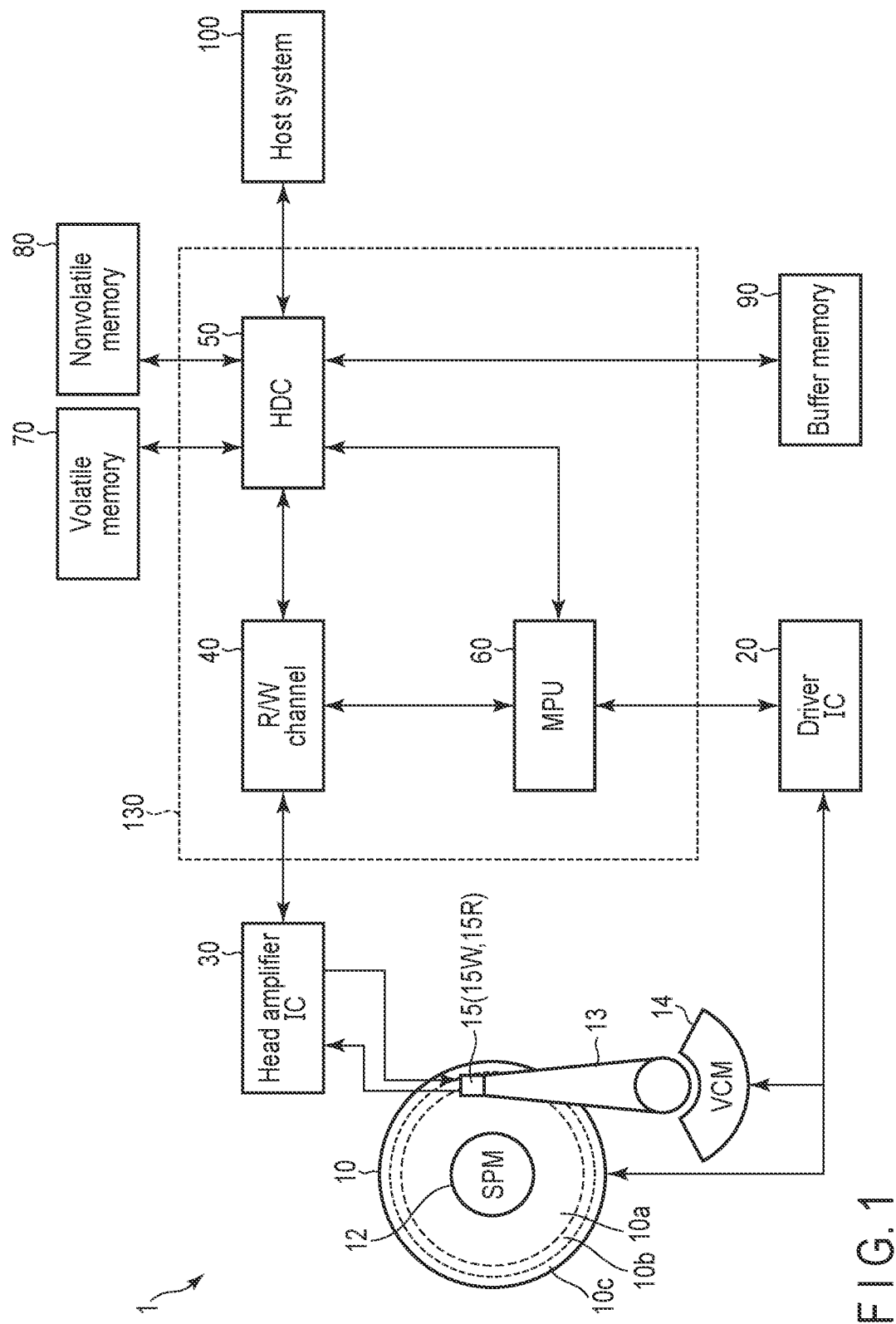
F I G. 1

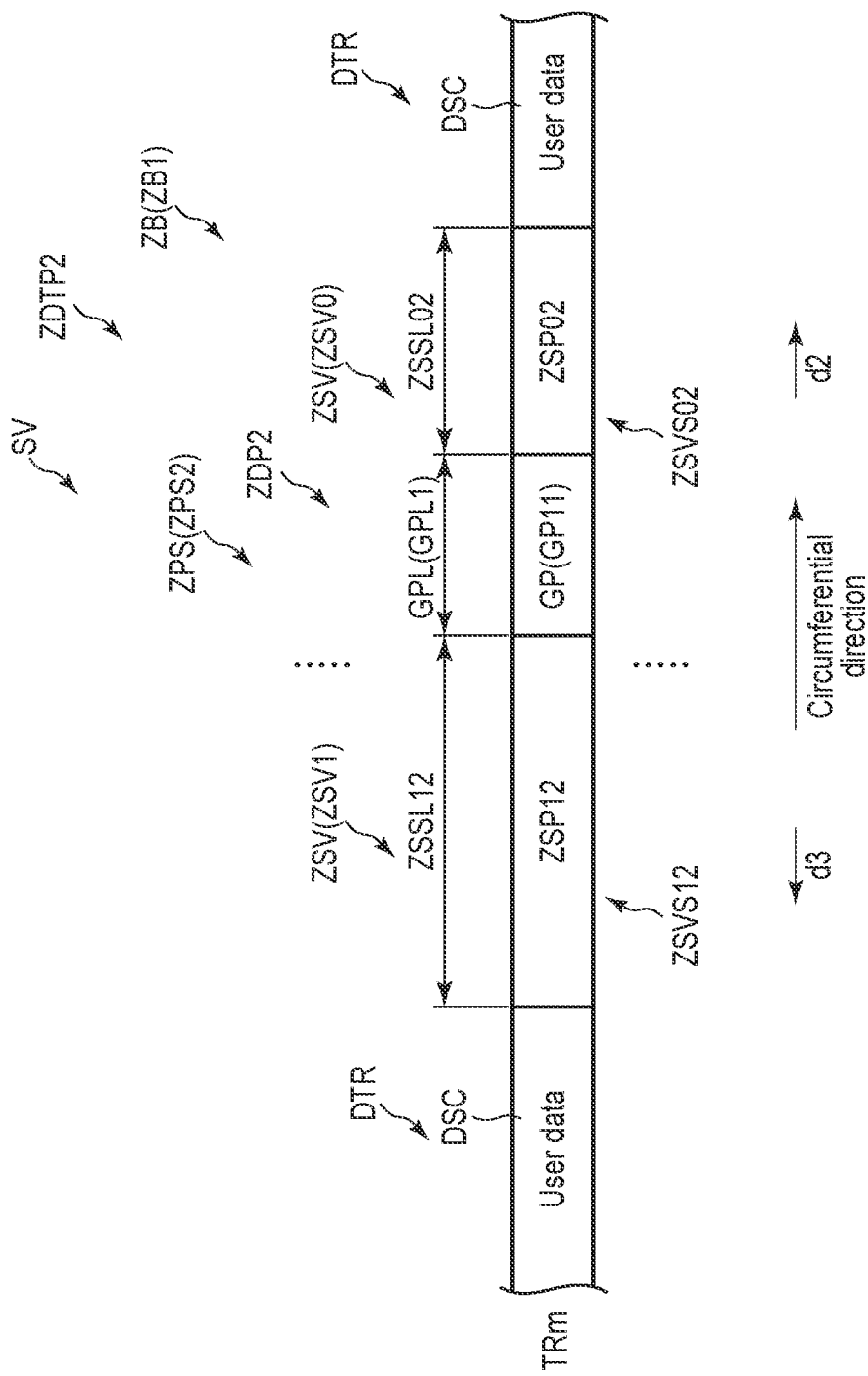
F I G. 4

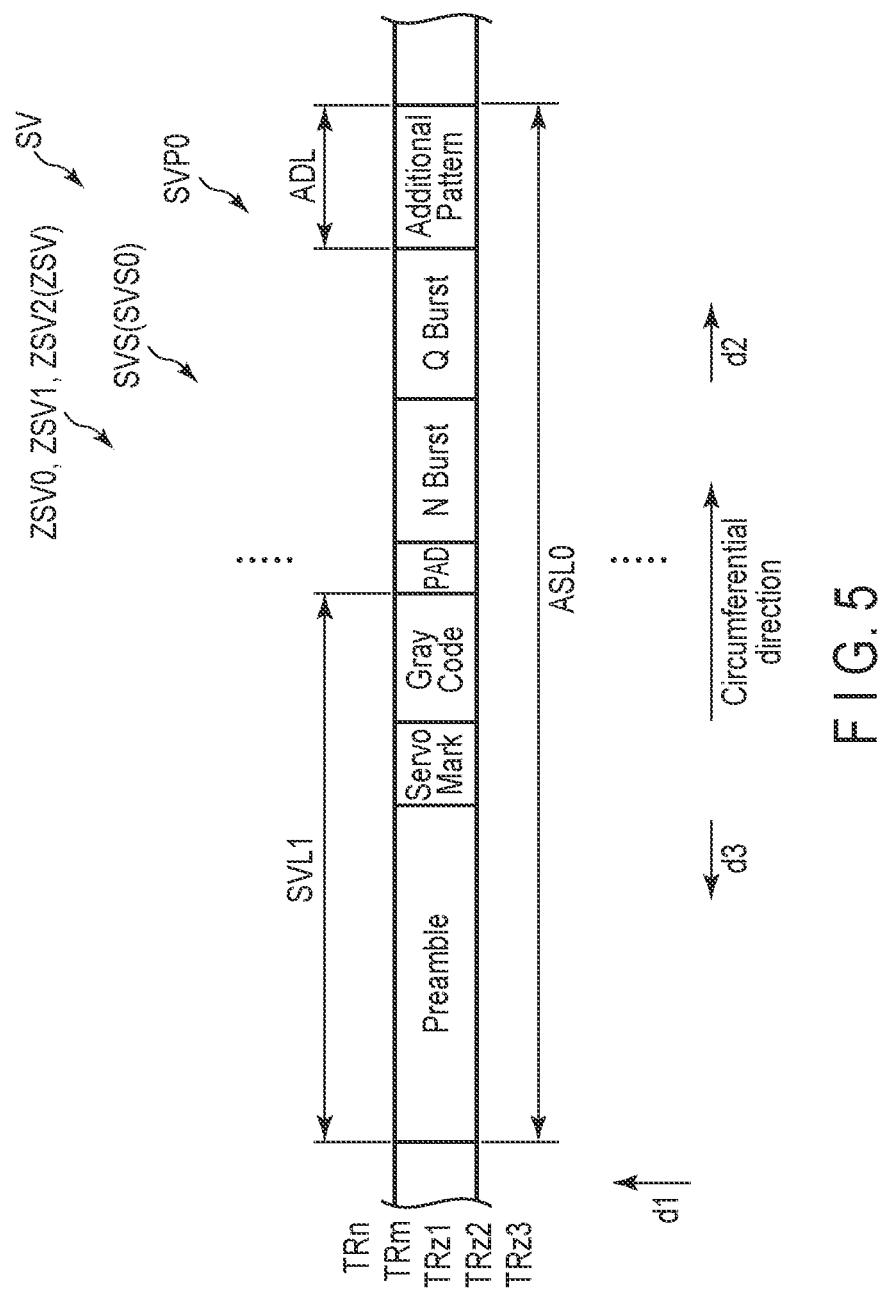
F I G. 5

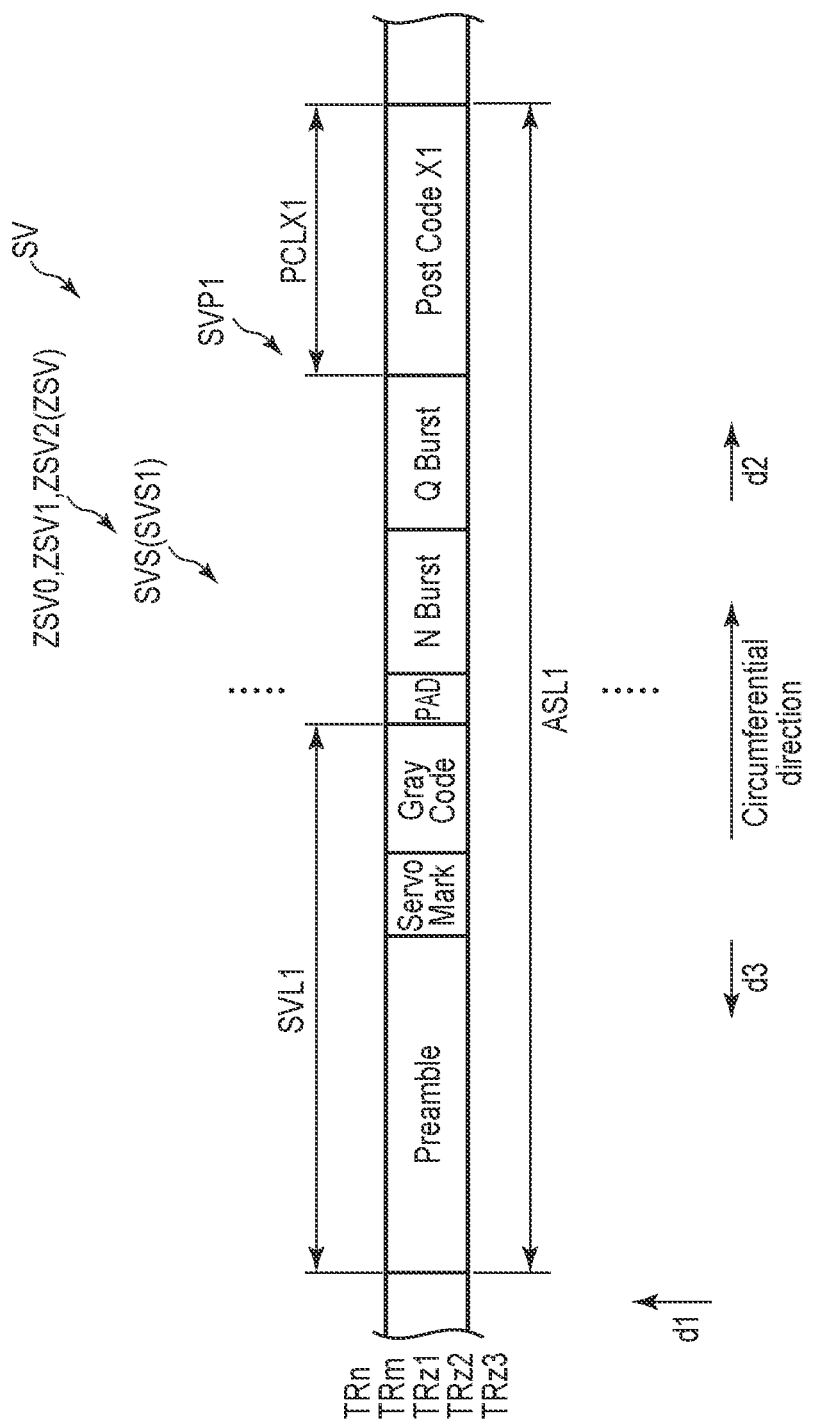
F I G. 6

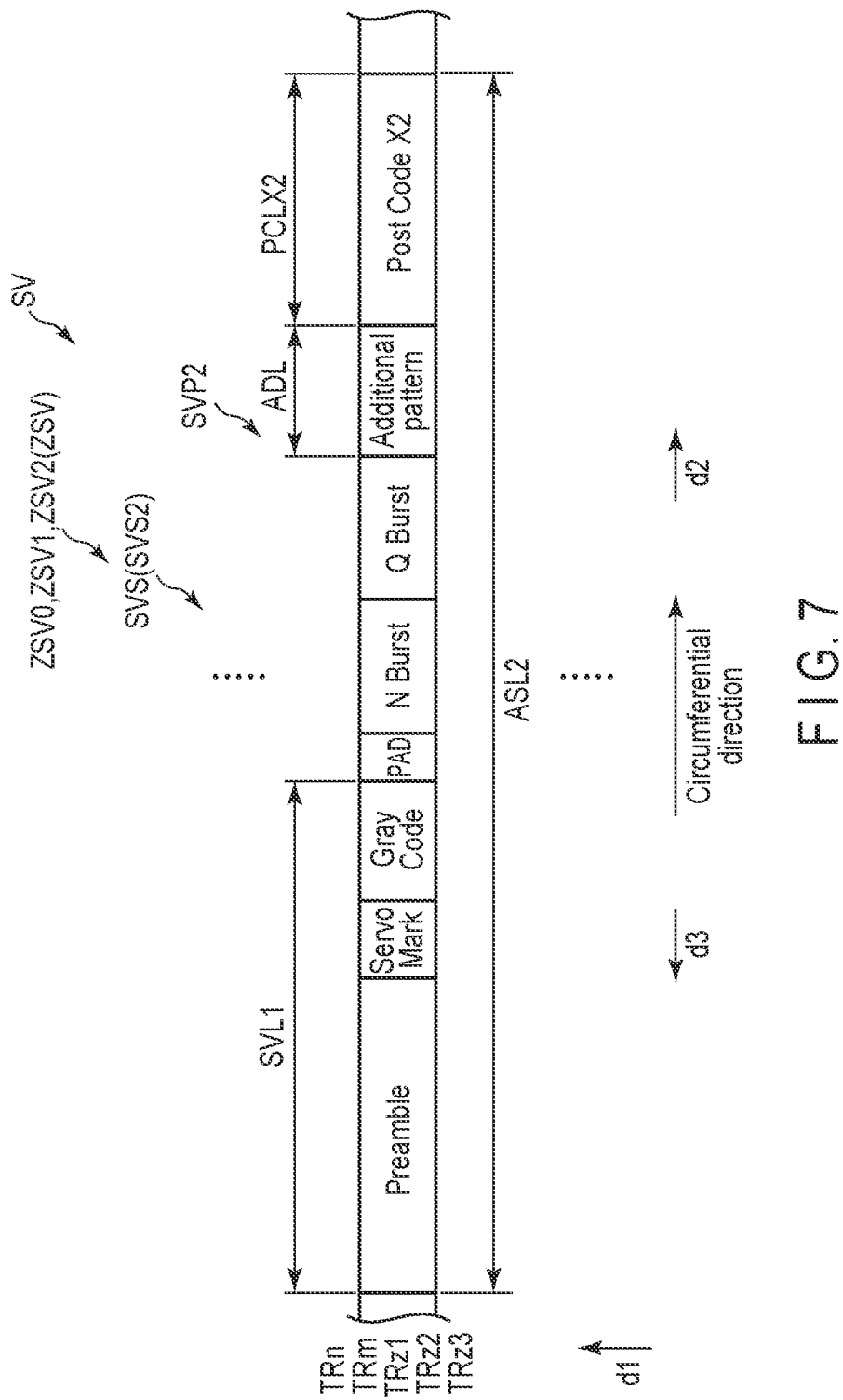
F I G. 7

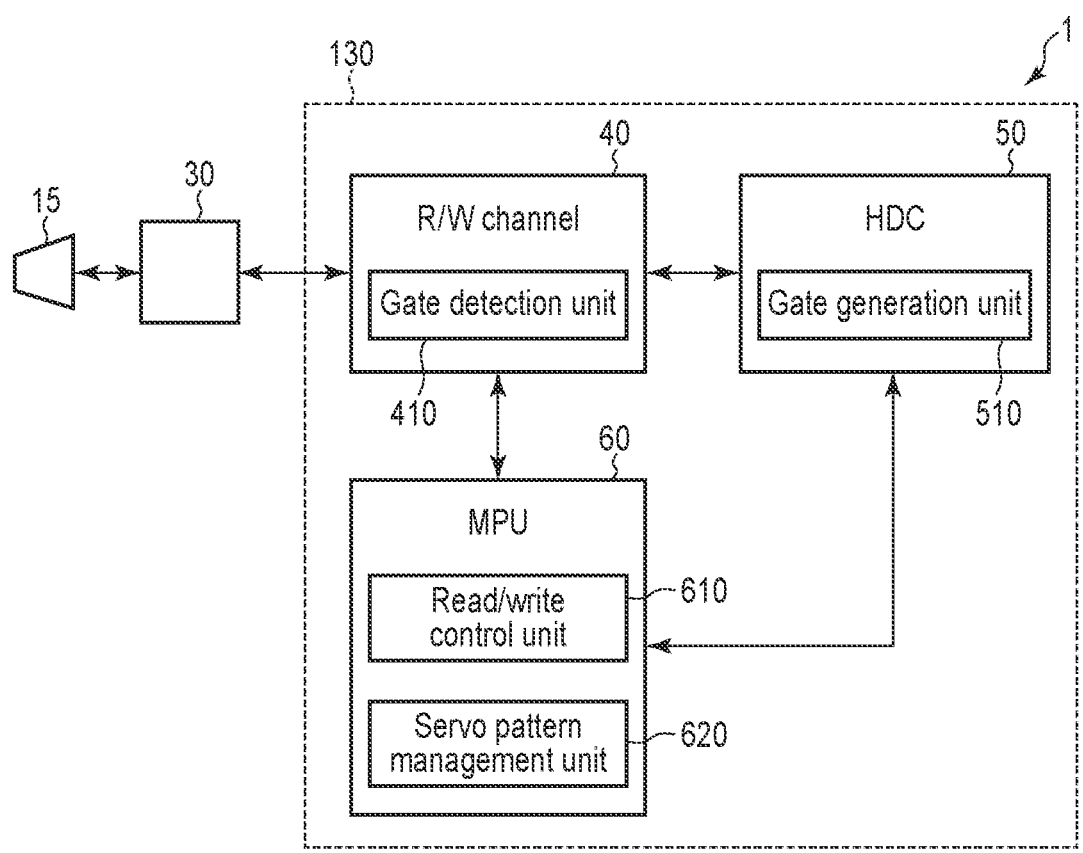
F I G. 8

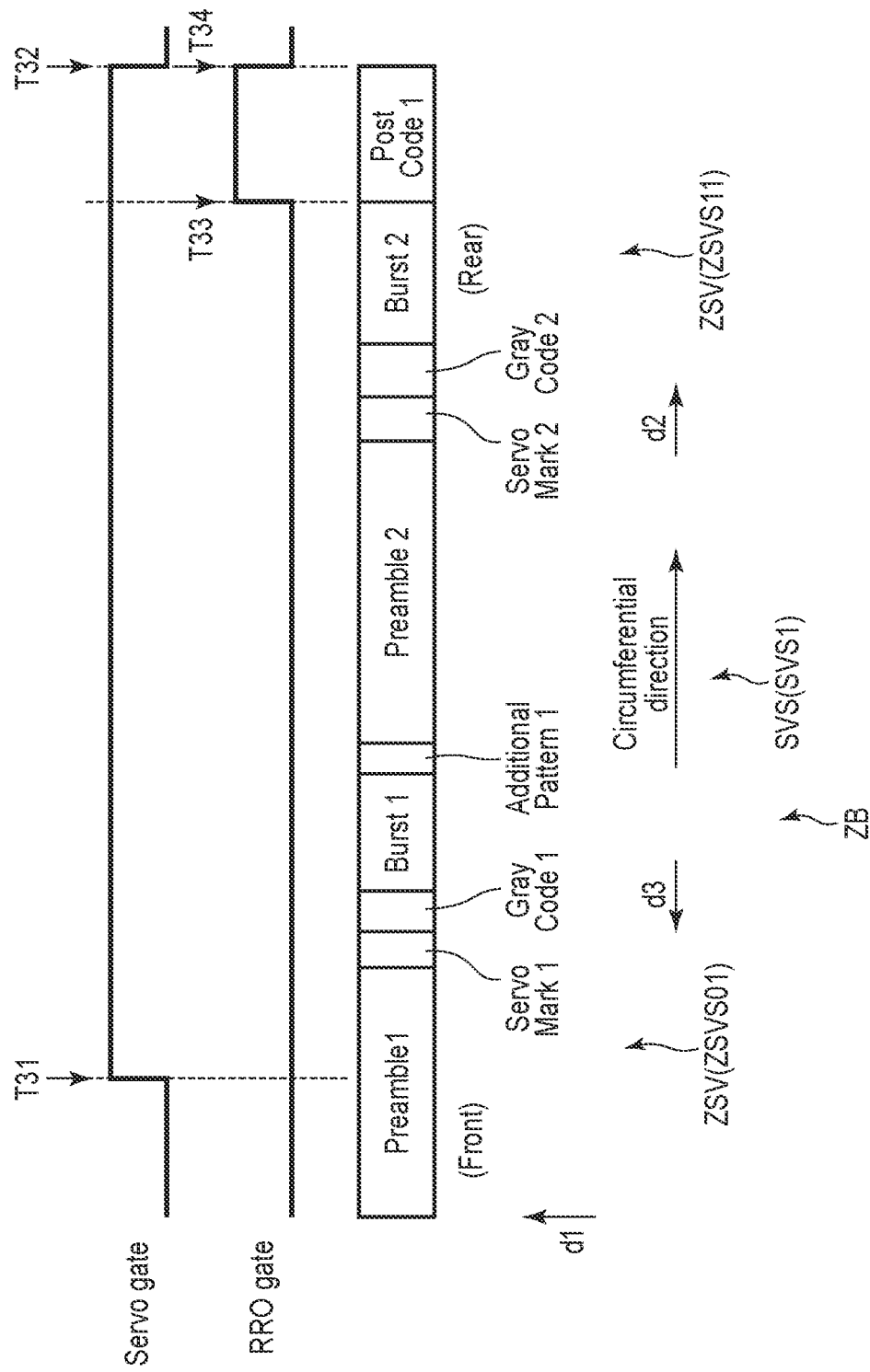
F I G. 14

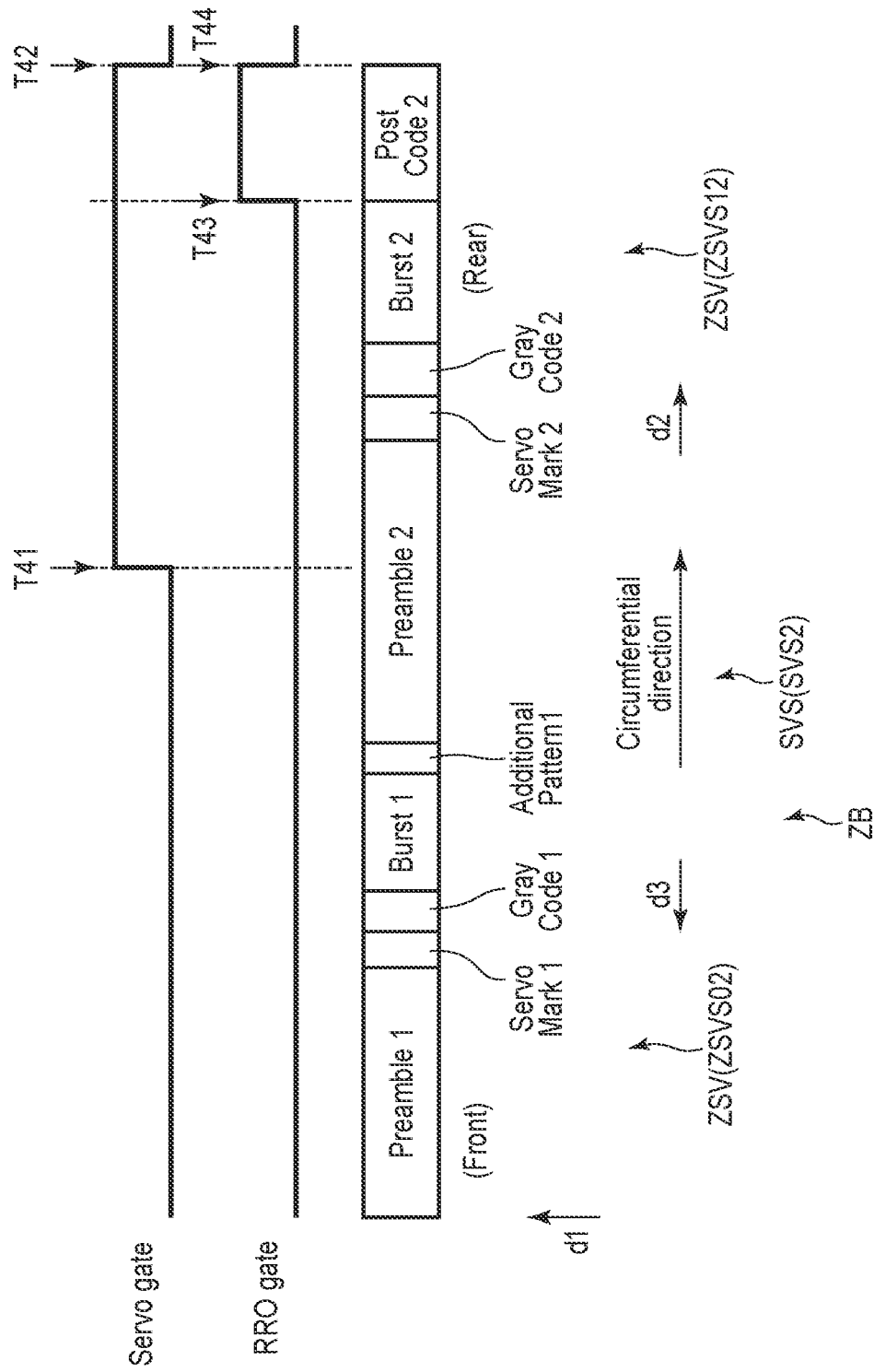
F I G. 15

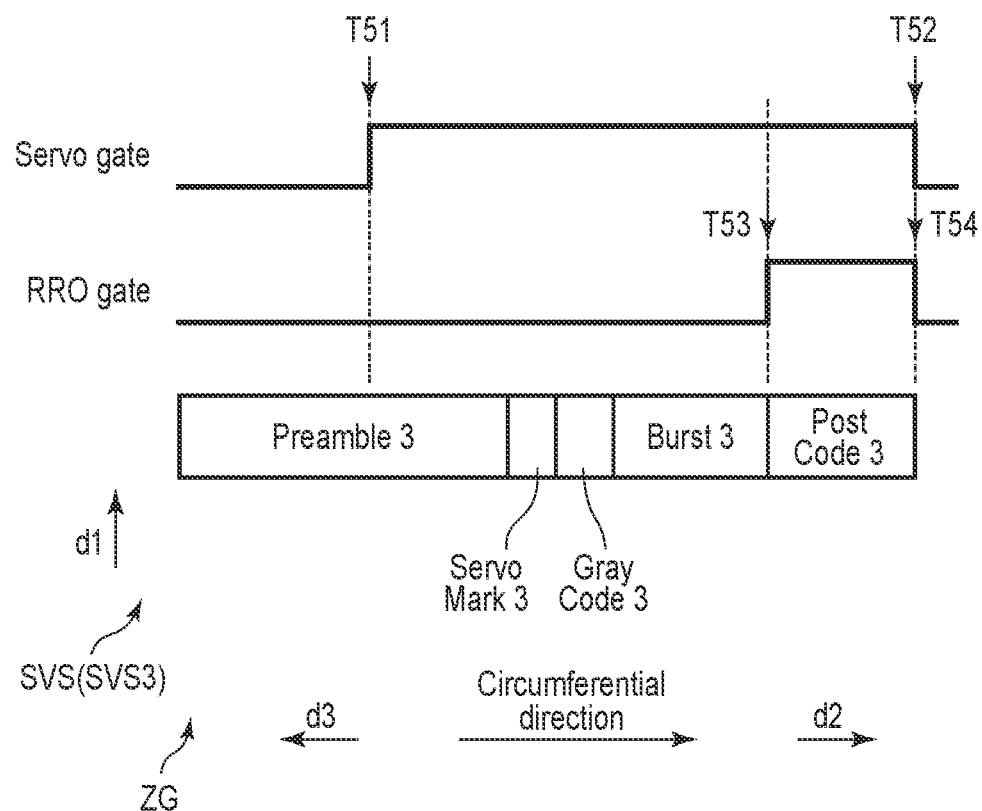
F I G. 16

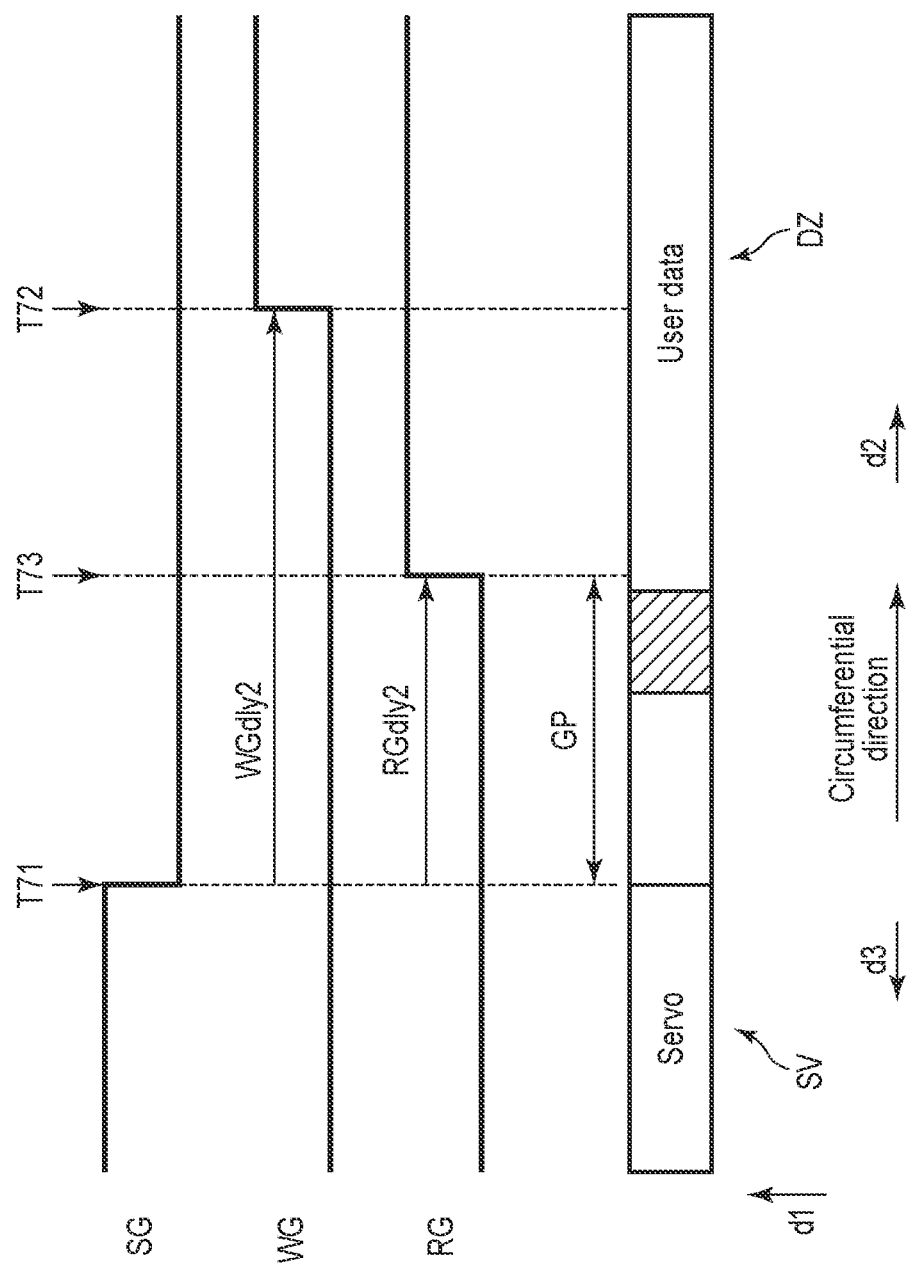
F I G. 18

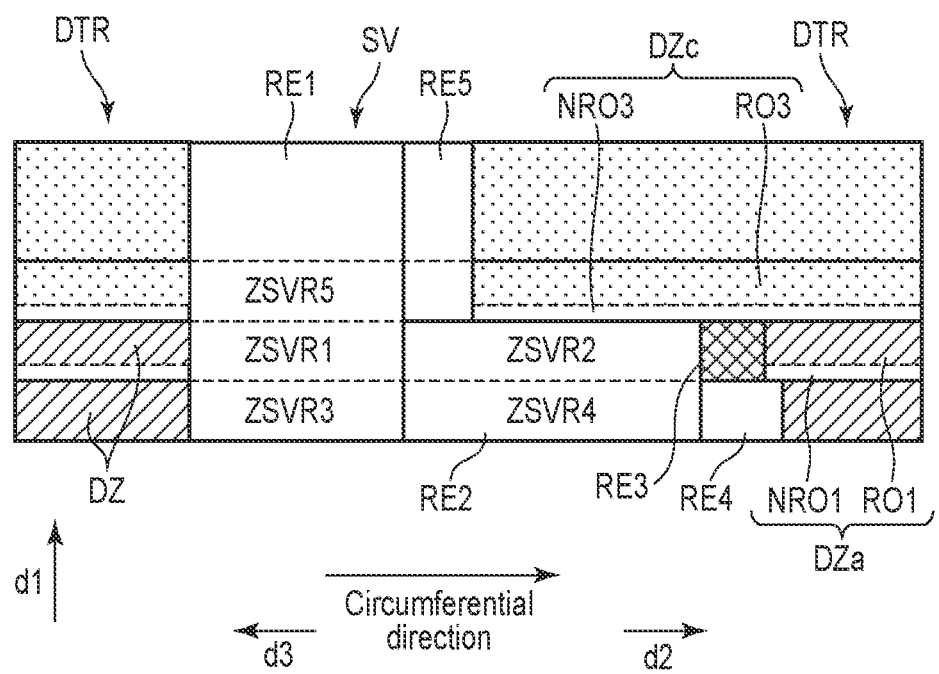
F I G. 24

MAGNETIC DISK DEVICE THAT CORRECTS POSITION OF HEAD BY DEMODULATION

CROSS-REFERENCE TO RELATED APPLICATIONS

This application is based upon and claims the benefit of priority from Japanese Patent Application No. 2022-034587, filed Mar. 7, 2022, the entire contents of which are incorporated herein by reference.

FIELD

Embodiments described herein relate generally to a magnetic disk device.

BACKGROUND

There are a conventional magnetic recording (CMR) mode (or conventional recording mode) magnetic disk device in which writing is performed on a plurality of tracks at intervals in a radial direction of a disk, a shingled write magnetic recording (SMR) or shingled write recording (SWR) mode magnetic disk device in which overwriting is performed on a plurality of tracks in the radial direction of the disk, and a hybrid recording mode magnetic disk in which the CMR and SMR or SWR are selected and executed. A magnetic disk includes servo areas such as a preamble area, a servo mark area, a gray code area, and a post code area. Each of the CMR, SMR or SWR, and hybrid recording type magnetic disk devices can include servo areas including a corresponding post code area.

BRIEF DESCRIPTION OF THE DRAWINGS

FIG. 1 is a block diagram showing a configuration of a magnetic disk device according to a comparative example.

FIG. 4 is a schematic diagram showing another example of the data pattern of the track on the disk.

FIG. 5 is a schematic diagram showing an example of a servo sector of the servo area shown in FIG. 2.

FIG. 6 is a schematic diagram showing an example of a servo sector of the servo area.

FIG. 7 is a schematic diagram showing another example of the servo sector of the servo area.

FIG. 8 is a block diagram showing an example of a configuration of a head, a head amplifier IC, and a system controller shown in FIG. 1.

FIG. 14 is a schematic diagram illustrating an example of a front side servo read processing in the double zone servo area of the disk according to the first embodiment.

FIG. 15 is a schematic diagram illustrating an example of a rear side servo read processing in the double zone servo area of the disk according to the first embodiment.

FIG. 16 is a schematic diagram illustrating an example of servo read processing in a single zone servo area of the disk according to the first embodiment.

FIG. 18 is a schematic diagram showing a part of the servo area, a gap, and a data zone as aligned in the circumferential direction of the disk according to the first embodiment, together with an example of a servo gate, a write gate, and a read gate.

FIG. 24 is a schematic diagram partially showing the areas in the circumferential direction of the disk according to the second embodiment, illustrating one servo area and two data areas.

DETAILED DESCRIPTION

Figure 2:
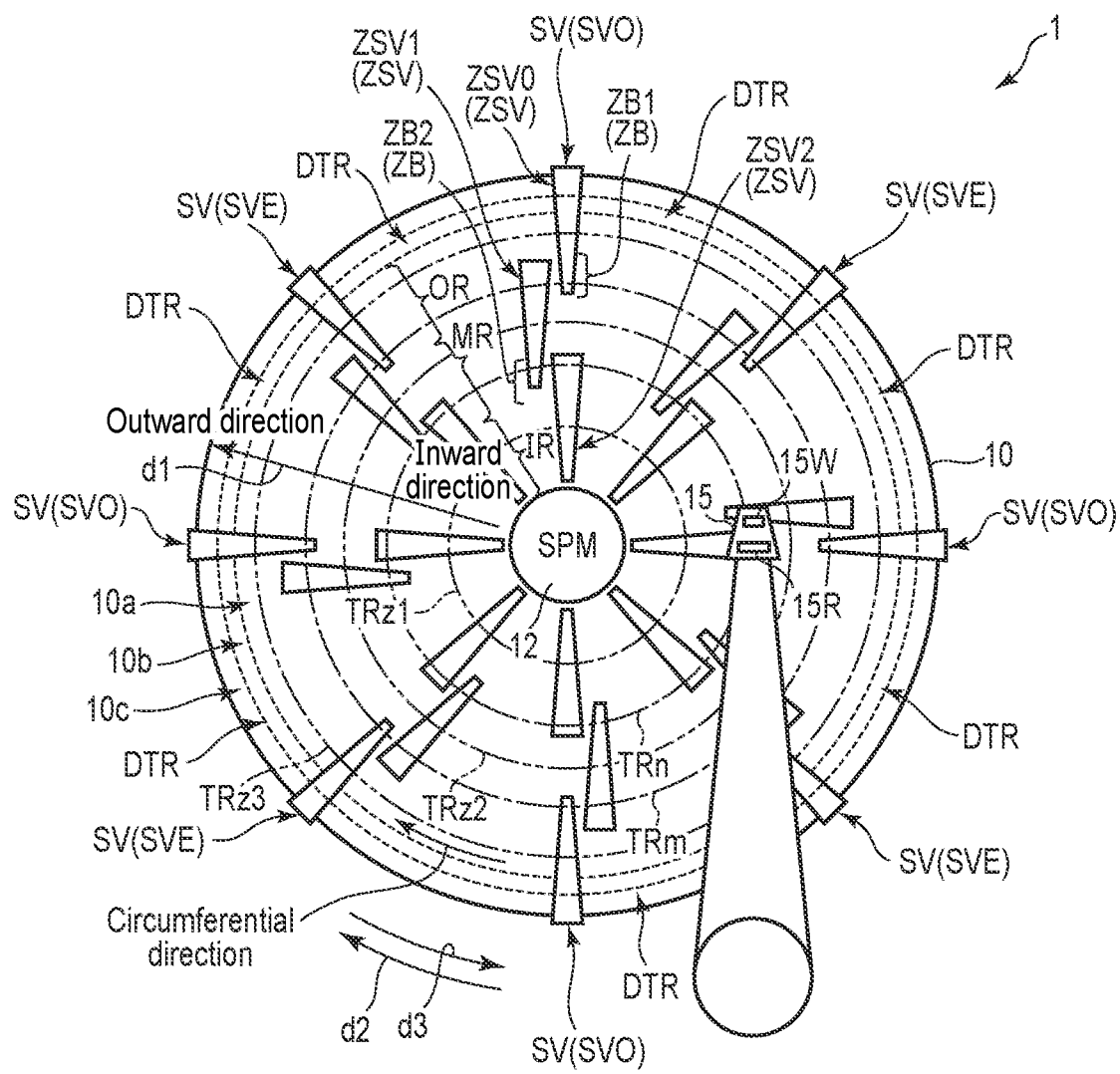
FIG. 2 is a schematic diagram showing an example of arrangement of a servo area of a disk according to the comparative example.

In general, according to one embodiment, there is provided a magnetic disk device comprising: a disk including a zone servo boundary area including a first area of a first servo frequency, a second area of a second servo frequency, and a third area of the first servo frequency, in a servo area; a head including a write head for writing data to the disk and a read head for reading data from the disk; and a controller demodulating first servo data of the first area read by the head to derive a position of the head, and demodulating first corrected data of the third area read by the head to correct the position of the head, to position the head in association with a predetermined track. The first area, the second area, and the third area are aligned in order in a traveling direction of the head for the disk. The first area and the second area are adjacent to each other in a circumferential direction of the disk. The second area and the third area are adjacent to each other in the circumferential direction of the disk.

Comparative Example

First, a comparative example will be described with reference to the accompanying drawings. FIG. 1 is a block diagram showing a configuration of a magnetic disk device 1 according to the comparative example.

As shown in FIG. 1, the magnetic disk device 1 comprises a head-disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 that is a single-chip integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the driving of the SPM 12. The arm 13 and the VCM 14 constitute an actuator. The actuator controls movement of the head 15 mounted on the arm 13 to a predetermined position of the disk 10 by the driving of the VCM 14. Two or more disks 10 and two or more heads 15 may be provided.

On the disk 10, a user data area 10*a* which is available to the user, a media cache (or often referred to as a media cache area) 10*b* where data (or commands) transferred from the host, and the like are temporarily held before written to a predetermined area of the user data area 10*a*, and a system area 10*c* where information necessary for system management is written, are allocated to an area where the data can be written. The media cache 10*b* may not be arranged on the disk 10.

A direction from an inner circumference to an outer circumference on the disk 10 is hereinafter referred to as a radial direction. In a direction parallel to the radial direction, a direction from the inner circumference to the outer circumference is referred to as an outward direction (outside), and a direction from the outer circumference to the inner circumference is referred to as an inward direction (inside). A direction perpendicular to the radial direction on the disk 10 is referred to as a circumferential direction. The circumferential direction corresponds to the direction along the circumference of the disk 10.

Alternatively, a predetermined position on the disk 10 in the radial direction may be referred to as a radial position, and a predetermined position on the disk 10 in the circumferential direction may be referred to as a circumferential position. The radial position and the circumferential position may be collectively and simply referred to as a position. The radial position corresponds to, for example, a distance from the center of rotation to a predetermined radial position on the disk 10, a distance from the innermost circumference to a predetermined radial position on the disk 10, a distance from a predetermined radial position to another radial position on the disk 10, or the like.

The disk 10 is divided into a plurality of areas (hereinafter often referred to as zones) for respective predetermined ranges of the radial direction. Each of the zones includes a plurality of tracks. The areas obtained by dividing the disk 10 in the radial direction may be referred to as radial areas. The radial areas include zones, tracks, and the like.

The "track" is used to indicate one of a plurality of areas divided in the radial direction on the disk 10, a path of the head 15 at a predetermined radial position, data extending in the circumferential direction on the disk 10, data of one circumference written to the track at a predetermined radial position, data written to a predetermined track on the disk 10, a part of data written to a predetermined track on the disk 10, or other various meanings.

The "sector" is used to indicate one of a plurality of areas obtained by dividing a predetermined track on the disk 10 in the circumferential direction, data written to a predetermined circumferential position at a predetermined radial position on the disk 10, data written to a predetermined sector of a predetermined track on the disk 10, and other various meanings.

The "width of the track in the radial direction" may be referred to as a "track width". The "path through the central position of the track width in a predetermined track" may be referred to as a "track center". The "width of the sector in the radial direction" may be referred to as a "sector width". The "path through the central position of the sector width in a predetermined sector" may be referred to as a "sector center". A sector center matches to a track center. The terms "same", "identical", "matching", "equivalent" and the like imply not only the meaning of being exactly the same, but also the meaning of being different to the extent that they can be regarded as substantially the same. The "track center of a predetermined track" may be hereinafter simply referred to as a "track". In addition, the "sector center of a predetermined sector" may be simply referred to as a "sector".

The head 15 includes a slider as a main body, and comprises a write head 15W and a read head 15R that are mounted on the slider. The write head 15W writes data to the disk 10. In the following descriptions, "writing data" may be referred to as "writing", "data write", "write process", and the like. The read head 15R reads data recorded in the track on the disk 10. In the following descriptions, "reading data" may be referred to as "reading", "data read", "read process", and the like.

The write head 15W may be simply referred to as the head 15, the read head 15R may be simply referred to as the head 15, and the write head 15W and the read head 15R may also be collectively referred to as the head 15. A central part of the head 15 may be simply referred to as the head 15, a central part of the write head 15W may be simply referred to as the write head 15W, and a central part of the read head 15R may be simply referred to as the read head 15R.

The "central part of the write head 15W" may be simply referred to as the "head 15", and the "central part of the read head 15R" may be simply referred to as the "head 15". In the following descriptions, "positioning the central part of the head 15 in a track center of a predetermined track" may be referred to as "positioning the head 15 on a predetermined track", "arranging the head 15 on a predetermined track", "positioning the head 15 on a predetermined track", and the like.

FIG. 2 is a schematic diagram showing an example of the arrangement of a servo area SV of the disk 10 according to the comparative example. As shown in FIG. 2, a direction toward the outer circumference of the disk 10 in the radial direction d1 is referred to as an outward direction (outside), and a direction opposite to the outward direction is referred to as an inward direction (inside). In addition, as shown in FIG. 2, a direction of rotation of the disk 10 in the circumferential direction is referred to as a rotational direction d3. In the example shown in FIG. 2, the rotational direction d3 is illustrated as a counterclockwise direction, but may be an opposite (clockwise) direction.

In addition, the traveling direction d2 of the head 15 relative to the disk 10 is opposite to the rotational direction d3. The traveling direction d2 is the direction in which the head 15 sequentially writes and reads data to the disk 10 in the circumferential direction, i.e., the direction in which the head 15 travels with respect to the disk 10 in the circumferential direction.

In FIG. 2, the user data area 10a is divided into an inner circumferential area IR located in the inward direction, an outer circumferential area OR located in the outward direction, and a middle circumferential area MR located between the inner circumferential area IR and the outer circumferential area OR.

The disk 10 includes a plurality of servo areas SV and a plurality of data areas DTR. For example, the plurality of servo areas SV may extend radially in the radial direction of the disk 10 and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in a form of islands in the radial direction and may be discretely arranged at different predetermined intervals in the circumferential direction. One servo area SV on a predetermined track may be hereinafter referred to as a "servo sector". The "servo area SV" may be referred to as a "servo sector SV". The servo sector includes servo data. The "arrangement of several servo data elements in the servo sector, and the like" may be hereinafter referred to as a "servo pattern". The "servo data written in the servo sector" may be referred to as the "servo sector".

Each of a plurality of data areas DTR is arranged between a plurality of servo areas SV. For example, the data area DTR corresponds to the area between two continuous servo areas SV in the circumferential direction. One data area DTR on a predetermined track may be hereinafter referred to as the "data sector". The "data area DTR" may be referred to as a "data sector DTR". The data sector includes user data. The "user data written to the data sector" may be referred to as the "data sector". The "data sector" may be referred to as the "user data". In addition, "a pattern constituted by several data elements" may be referred to as a "data pattern". In the example shown in FIG. 2, the data pattern of a predetermined track is composed of servo data (servo sectors) and user data (data sectors).

The servo area SV includes a plurality of zone servo areas ZSV and the like. In addition to the zone servo areas ZSV, the servo area SV may include an area including a gap (i.e., a gap between circumferential positions of two zone servo areas), an area including the servo data, the data area DTR, and the like. The plurality of zone servo areas ZSV are discretely arranged in the radial direction. Each of the zone servo areas ZSV extends in the radial direction.

One zone servo area (servo area) ZSV in a predetermined track is referred to as a "zone servo sector" or "servo sector". The "zone servo area (servo area) ZSV" may be referred to as a "zone servo sector ZSV" or "servo sector ZSV". The "servo data written in the zone servo sector" may be referred to as "zone servo sector" or "servo sector". The "arrangement of several servo data elements in the zone servo sector, and the like" may be referred to as a "zone servo pattern" or "servo pattern". One servo area SV on a predetermined track may be hereinafter referred to as a "zone pattern sector".

The "servo area SV" may be referred to as the "zone pattern sector". In the following descriptions, "at least one data element, and the like written to the zone pattern sector" may be referred to as the "zone pattern sector". The zone pattern sector includes at least one zone servo sector. The "data pattern of the zone pattern sector" may be hereinafter referred to as a "zone data pattern".

A servo frequency of the zone servo area arranged in the outward direction among the plurality of zone servo areas ZSV arranged from the inward direction to the outward direction in a predetermined servo area SV is larger than a servo frequency of the zone servo area arranged in the inward direction of the plurality of zone servo areas ZSV. In addition, a servo frequency of the zone servo sector arranged in the outward direction of a predetermined zone servo area ZSV is larger than a servo frequency of the zone servo sector arranged in the inward direction of this zone servo area ZSV. A linear velocity (travel speed) of the head 15 relative to the disk 10 is higher at the radial position in the inward direction than that at the radial position in the outward direction. For this reason, a format efficiency can be improved by making the servo frequency of the servo area in the outward direction larger than the servo frequency of the servo area in the inward direction on the disk 10 as described above. The servo frequency is the frequency at which the servo data is written to or read from the servo area.

In the example shown in FIG. 2, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may be arranged in a stair pattern in the radial direction.

The zone servo area ZSV2 is located in the inward direction than the zone servo area ZSV1. The zone servo area ZSV0 is located in the outward direction than the zone servo area ZSV1. For example, the zone servo area ZSV2 is arranged from the inner circumferential area IR to the middle circumferential area MR, the zone servo area ZSV1 is arranged from the inner circumferential area IR to the outer circumferential area OR, and the zone servo area ZSV0 is arranged from the middle circumferential area MR to the outer circumferential area OR. In the following descriptions, a predetermined radial area in which the plurality of zone servo areas ZSV are arranged in the circumferential direction, in a predetermined servo area SV, may be referred to as a zone servo boundary area, double servo area or double zone servo area ZB.

The zone servo area ZSV2 is arranged on a track TRz1. An outer circumferential edge of the zone servo area ZSV2 and an inner circumferential edge of the zone servo area ZSV1 are arranged on a track TRn. In other words, the outer circumferential edge of the zone servo area ZSV2 and the inner circumferential edge of the zone servo area ZSV1 are arranged in the double zone servo area ZB2.

The zone servo area ZSV1 is arranged on a track TRz2. An outer circumferential edge of the zone servo area ZSV1 and an inner circumferential edge of the zone servo area ZSV0 can be arranged on a track TRm. In other words, the outer circumferential edge of the zone servo area ZSV1 and the inner circumferential edge of the zone servo area ZSV0 are arranged in a double zone servo area ZB1. The zone servo area ZSV0 is arranged on a track TRz3.

For example, a servo frequency of the zone servo area ZSV1 is larger than a servo frequency of the zone servo area ZSV2, and a servo frequency of the zone servo area ZSV0 is larger than the servo frequency of the zone servo area ZSV1. The servo frequency is equal to a frequency of a preamble, which will be described later.

The servo areas SV include, for example, a servo area (hereinafter often referred to as a main servo area) SVO and a servo area (hereinafter often referred to as a sub-servo area) SVE. In the following descriptions, one main servo area SVO in a predetermined track may be referred to as a "main zone pattern sector SVO", and one sub-servo area SVE in a predetermined track may be referred to as a "sub-zone pattern sector SVE".

The main servo area SVO may be referred to as the "main zone pattern sector SVO", and the sub-servo area SVE may be referred to as the "sub-zone pattern sector SVE". A data pattern of the main zone pattern sector (hereinafter often referred to as a "main zone data pattern") may be the same as or different from a data pattern of the sub-zone pattern sector (hereinafter often referred to as a "sub-zone data pattern").

In the example shown in FIG. 2, the main servo areas SVO and the sub-servo areas SVE are alternately arranged at intervals in the circumferential direction. For example, one sub-servo area SVE is arranged between two main servo areas SVO that are continuously aligned at an interval in the circumferential direction. In other words, one sub-servo area SVE is arranged between two main servo areas SVO that are continuously aligned at an interval in the circumferential direction. For example, when all the servo areas SV of the disk 10 are assigned continuous numbers in order, the main servo areas SVO correspond to the odd-numbered servo areas SV, and the sub-servo areas SVE correspond to the even-numbered servo areas SV. Two or more sub-servo areas SVE may be arranged between two main servo areas SVO that are continuously aligned at an interval, in the circumferential direction.

The main servo areas SVO and the sub-servo areas SVE may be composed of, for example, only servo areas that read and demodulate the servo data as a whole (hereinafter often referred to as normal servo areas). In the following descriptions, "reading and demodulating the servo data" may be referred to as "servo-reading". The main servo areas SVO and the sub-servo areas SVE may be composed of, for example, the normal servo areas, and servo areas (hereinafter often referred to as short servo areas) where servo-reading is performed in a smaller circumferential range of the servo data than a circumferential range of the servo data where servo-reading is performed in the normal servo areas.

For example, the main servo area SVO may be composed of the normal servo area and the sub-servo area SVE may be composed of the short servo area. Alternatively, for example, the main servo area SVO may also be composed of the short servo area and the sub-servo area SVE may also be composed of the normal servo area.

In the following descriptions, one normal servo area on a predetermined track may be referred to as a "normal servo sector", and one short servo area on a predetermined track may be referred to as a "short servo sector". The normal servo area may also be referred to as the "normal servo sector", and the short servo area may also be referred to as the "short servo sector". The "servo data of the normal servo sector" may be referred to as the "normal servo data", and the "servo data of the short servo sector" may be referred to as the "short servo data".

Alternatively, the "normal servo data" may be referred to as the "normal servo sector", and the "short servo data" may be referred to as the "short servo sector". A servo pattern of the normal servo data (hereinafter often referred to as a normal servo pattern) may be the same as or different from a servo pattern of the short servo sector (hereinafter often referred to as a short servo pattern).

For example, a circumferential length of the short servo sector is shorter than a circumferential length of the normal servo sector. The "circumferential length" may be hereinafter simply referred to as a "length". For example, the length of the short servo sector may be the same as the length of the normal servo sector or may be longer than the length of the normal servo sector.

Figure 3:
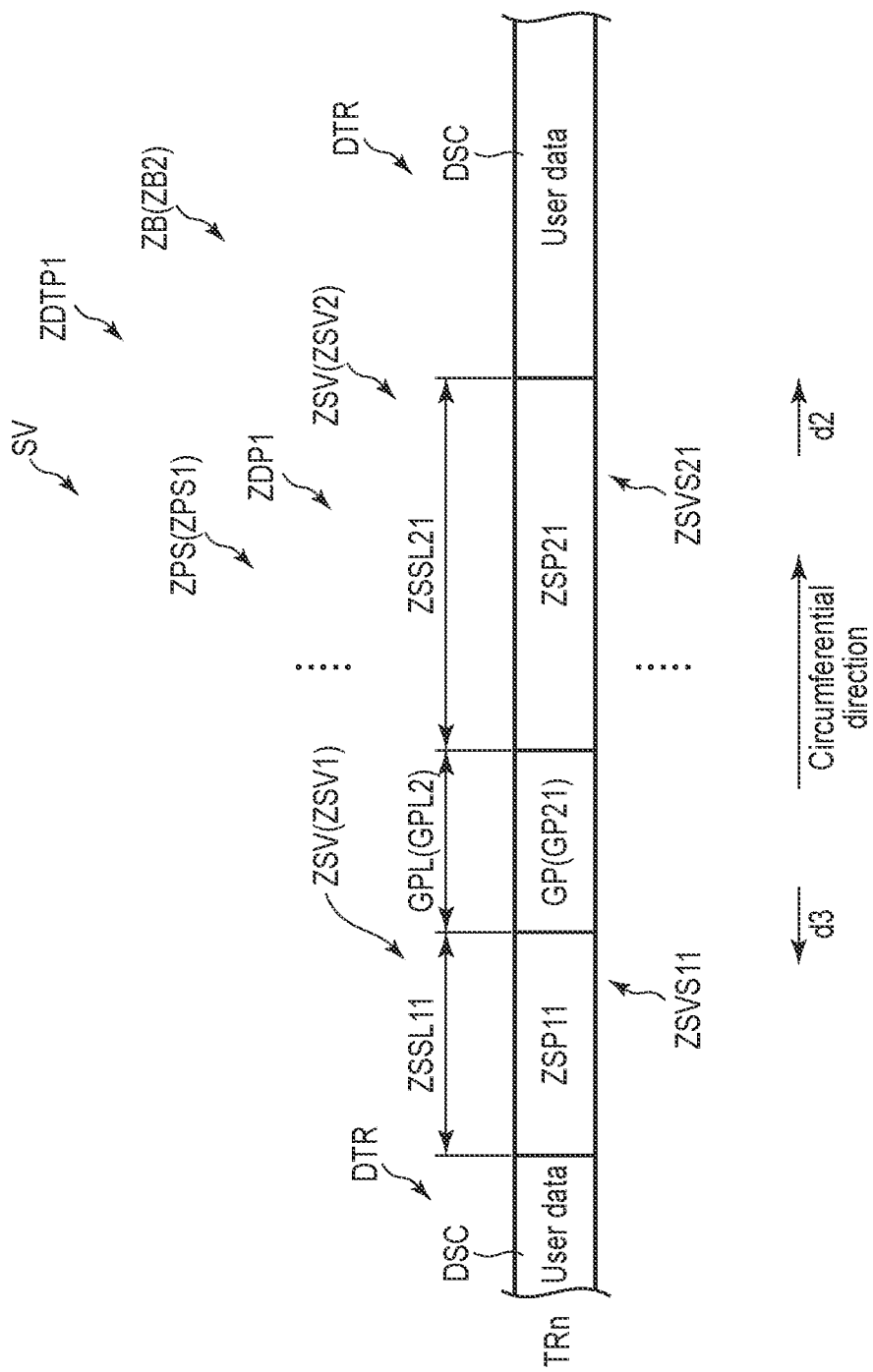
FIG. 3 is a schematic diagram showing an example of a data pattern of a track on the disk.

Next, an example of a data pattern of a predetermined track in the double-zone servo area ZB of the disk 10 will be described with reference to FIG. 3 and FIG. 4. FIG. 3 is a schematic diagram showing an example of data pattern ZDTP1 of the track TRn on the disk 10.

As shown in FIG. 3, the traveling direction d2 and the rotational direction d3 are the directions along the circumferential direction. The traveling direction d2 is the direction in which the head 15 sequentially writes data to and reads data from the disk 10 in the circumferential direction. The track TRn includes a data pattern ZDTP1. The data pattern ZDTP1 is composed of a zone pattern sector ZPS (ZPS1) and a data sector DSC of the data area DTR.

In the example shown in FIG. 3, the zone pattern sector ZPS1 is arranged between two data sectors DSC aligned at an interval in the traveling direction d2, in the data pattern ZDTP1. The zone pattern sector ZPS1 includes a zone data pattern ZDP1. The zone data pattern ZDP1 is composed of at least one data element, for example, a zone servo sector ZSVS11 of the zone servo area ZSV (ZSV1), a gap (hereinafter often referred to as a zone servo gap) GP (GP21), and a zone servo sector ZSVS21 of the zone servo area ZSV (ZSV2). In the zone data pattern ZDP1, the zone servo sector ZSVS11, the gap GP (GP21), and the zone servo sector ZSVS21 are aligned in order of their description in the traveling direction d2.

In the following descriptions, in a predetermined zone data pattern, a predetermined zone servo sector arranged in front of a predetermined zone servo sector in the rotational direction d3 may be referred to as a "front zone servo sector", and a predetermined zone servo sector arranged behind the predetermined zone servo sector in the rotational direction d3 may be referred to as a "rear zone servo sector". The front zone servo sector ZSVS11 includes the zone servo pattern ZSP11. In addition, the rear zone servo sector ZSVS21 includes a zone servo pattern ZSP21.

For example, a length ZSSL11 of the front zone servo sector ZSVS11 is shorter than a length ZSSL21 of the rear zone servo sector ZSVS21. A length GPL2 (GPL) of the gap GP21 (GP) corresponds to a circumferential distance between the front zone servo sector ZSVS11 and the rear zone servo sector ZSVS21. For example, the length GPL2 is varied in accordance with the length ZSSL11. The length GPL2 can be set to a length in which the front zone servo sector ZSVS11 is not overwritten to the rear zone servo sector ZSVS21 even if the front zone servo sector ZSVS11 is written.

FIG. 4 is a schematic diagram showing an example of a data pattern ZDTP2 of the track TRm on the disk 10.

As shown in FIG. 4, the track TRm includes the data pattern ZDTP2. The data pattern ZDTP2 is composed of a zone pattern sector ZPS (ZPS2) and a data sector DSC of the data area DTR.

In the example shown in FIG. 4, in the data pattern ZDTP2, the zone pattern sector ZPS2 is arranged between two data sectors DSC that are aligned at an interval in the traveling direction d2. The zone pattern sector ZPS2 includes a zone data pattern ZDP2. The zone data pattern ZDP2 is composed of at least one data element, for example, a zone servo sector ZSVS12 of the zone servo area ZSV (ZSV1), a gap GP (GP11), and a zone servo sector ZSVS02 of the zone servo area ZSV (ZSV0).

In the zone data pattern ZDP2, the zone servo sector ZSVS12, the gap GP (GP11), and the zone servo sector ZSVS02 are aligned in order of their description in the traveling direction d2. The front zone servo sector ZSVS12 includes a zone servo pattern ZSP12. In addition, the rear zone servo sector ZSVS02 includes a zone servo pattern ZSP02.

For example, a length ZSSL12 of the front zone servo sector ZSVS12 is longer than a length ZSSL02 of the rear zone servo sector ZSVS02. A length GPL1 (GPL) of the gap GP11 (GP) corresponds to a circumferential distance between the front zone servo sector ZSVS12 and the rear zone servo sector ZSVS02. The length GPL1 may be the same as or different from the length GPL2 shown in FIG. 3. For example, the length GPL1 is varied in accordance with the length ZSSL12. The length GPL1 can be set to a length in which the front zone servo sector ZSVS12 is not overwritten to the rear zone servo sector ZSVS02 even if the front zone servo sector ZSVS12 is written.

FIG. 5 is a schematic diagram showing an example of a servo sector SVS0 of the servo area SV. As shown in FIG. 5, the servo sector SVS0 of the servo area SV includes a predefined zone servo sector (for example, the rear zone servo sector ZSVS02 or the like) of the zone servo area ZSV0, predetermined zone servo sectors (for example, front zone servo sectors ZSVS11 and ZSVS12, or the like) of the zone servo area ZSV1, and a predetermined zone servo sector (for example, the rear zone servo sector ZSVS21 or the like) of the zone servo area ZSV2.

For example, the servo sector SVS0 includes the zone servo sector ZSVS11 of the zone servo area ZSV1 of the track TRn, the zone servo sector ZSVS21 of the zone servo area ZSVS2 of the track TRn, the zone servo sector ZSVS12 of the zone servo area ZSV1 of the track TRm, the zone servo sector ZSVS02 of the zone servo area ZSV0 of the track TRm, the zone servo sector of the zone servo area ZSV0 of the track TRz1, the zone servo sector of the zone servo area ZSV1 of the track TRz2, and the zone servo sector of the zone servo area ZSV2 of the track TRz3.

The servo sector SVS0 includes a servo pattern SVP0. The servo pattern SVP0 is composed of at least one servo data element, for example, a preamble, a servo mark or servo address mark, a gray code, PAD, burst data, and an additional pattern. In the servo pattern SVP0, the preamble, the servo mark, the gray code, the PAD, the burst data, and the additional pattern are aligned in order of their description in the traveling direction d2.

For example, in the servo pattern SVP0, the preamble, the servo mark, the gray code, the PAD, the burst data, and the additional patterns are continuously aligned in order of their description in the traveling direction d2.

In other words, the servo mark is located behind the preamble and adjacent to the preamble in the servo pattern SVP0. The term "adjacent" implies not only that data, objects, areas, spaces and the like are aligned to be in contact with each other, but also that they are aligned at predetermined intervals.

The gray code is adjacent to a rear part of the servo mark. The PAD is adjacent to a rear part of the gray code. The burst data is adjacent to a rear part of the PAD.

The additional pattern is located behind the burst data and adjacent to the burst data. The servo sector SVS0 may not include the additional pattern. The additional pattern corresponds to, for example, a pattern for determining a timing shift when reading and demodulating the data written to the disk 10. The phase data obtained by reading the additional pattern may be used, for example, to determine whether the timing of reading the burst data is shifted or not. In the following descriptions, the term "timing" may be used to mean "timing after a predetermined time from the reference timing when the read head 15R reads the predetermined data", "timing at which the read head 15R is arranged at a predetermined circumferential position", and the like.

The additional pattern is, for example, the data different from the post code to be described later. A frequency of the additional pattern is, for example, different from a frequency of the preamble. In other words, the frequency of the additional pattern is different from the frequency of the post code. For example, the frequency of the additional pattern is equal to the frequency of the burst data, for example, the frequency of the N burst and the frequency of the Q burst.

For example, the additional pattern is a period pattern of 4-bit length written at the burst frequency. A phase of the additional pattern periodically changes in the circumferential direction. The additional pattern is written in the data pattern in which the phases are equal in one servo track cycle in the radial direction d1 of the disk 10. In other words, the phase of the predetermined additional pattern is equal to the phase of the additional pattern radially adjacent to the predetermined additional pattern in the radial direction.

FIG. 5 shows a length ASL0 of the servo sector SVS0 and a length ADL of the additional pattern. The length ADL is shorter than, for example, a length of the post code which will be described later. In the following descriptions, the length of the PAD and the length of the burst may be constant or different from each other.

FIG. 6 is a schematic diagram showing an example of a servo sector SVS1 of the servo area SV. As shown in FIG. 6, the servo sector SVS1 of the servo area SV includes a predetermined zone servo sector of the zone servo area ZSV0, a predetermined zone servo sector of the zone servo area ZSV1, and a predetermined zone servo sector of the zone servo area ZSV2. For example, the servo sector SVS1 includes the zone servo sector ZSVS11 of the zone servo area ZSV1 of the track TRn, the zone servo sector ZSVS21 of the zone servo area ZSVS2 of the track TRn, the zone servo sector ZSVS12 of the zone servo area ZSV1 of the track TRm, the zone servo sector ZSVS02 of the zone servo area ZSV0 of the track TRm, the zone servo sector of the zone servo area ZSV0 of the track TRz1, the zone servo sector of the zone servo area ZSV1 of the track TRz2, and the zone servo sector of the zone servo area ZSV2 of the track TRz3. The servo sector SVS1 includes a servo pattern SVP1.

The servo pattern SVP1 is composed of at least one servo data element, for example, a preamble, a servo mark or servo address mark, a gray code, PAD, burst data, and a post code X1. In the servo pattern SVP1, the preamble, the servo mark, the gray code, the PAD, the burst data, and the post code X1 are aligned in order of their description in the traveling direction d2.

For example, in the servo pattern SVP1, the preamble, the servo mark, the gray code, the PAD, the burst data, and the post code X1 are continuously aligned in order of their description in the traveling direction d2. The post code is located behind the burst data and adjacent to the burst data. The servo sector SVS1 may not include the post code X1.

FIG. 6 shows a length ASL1 of the servo sector SVS1, a length SVL1 of a combination of the preamble, the servo mark, and the gray code, and a length PCLX1 of the post code.

The preamble includes preamble information for synchronizing with a reproduction signal of the servo pattern composed of the servo mark, the gray code, and the like.

The servo mark (or the servo address mark) includes servo mark information indicating start of the servo pattern.

The gray code is composed of an address (cylinder address) of a predetermined track, and an address of a servo sector of a predetermined track.

The burst data is data (relative position data) used to detect position shift (position error) in the radial direction d1 and/or the circumferential direction of the head 15 relative to a track center of a predetermined track, and is composed of a repeated pattern of a predetermined cycle.

The PAD includes PAD information of a synchronization signal such as a gap and a servo AGC.

The burst data is written in a data pattern in which the phase of the burst data is inverted by 180 degrees in one servo track cycle in the radial direction d1 of the disk 10. The servo track (servo cylinder) corresponds to a track to be subjected to the write process or read process according to a command from the host 100 or the like. For example, the burst data is used to acquire the position of the head 15 (hereinafter often referred to as a head position) in the radial direction d1 and/or circumferential direction on the disk 10.

The burst data includes, for example, N burst and Q burst. The N burst and the Q burst are written in data patterns in which the phases are shifted by 90 degrees with each other in the radial direction d1 of the disk 10.

The post code includes a path which is a target (hereinafter often referred to as a target path) for the head 15 arranged concentrically with the disk 10 caused by a shift (repeatable run out: RRO) synchronized with the rotation of the disk 10 when the servo data is written to the disk, for example, data (hereinafter referred to as RRO corrected data) for correcting an error resulting from distortion of the track for the track center, and the like. The area where the post code data (RRO corrected data) is written may be hereinafter referred to as a post code area, an RRO bit area or a corrected data storage area.

For convenience of description, an error resulting from distortion of the track to the target path caused by RRO may be hereinafter simply referred to as RRO. For example, the post code is included in the normal servo sector. The post code may be included in the short servo sector. The additional pattern is included in the short servo sector. The additional pattern may be included in the normal servo sector. For example, the length PCLX1 is longer than the length ADL in FIG. 5. The length ASL1 is longer than the length ASL0 in FIG. 5. The length PCLX1 may be shorter than or equal to the length ADL in FIG. 5. Alternatively, the length ASL1 may be shorter than or equal to the length ASL0 in FIG. 5.

FIG. 7 is a schematic diagram showing an example of a servo sector SVS2 of the servo area SV. As shown in FIG. 7, the servo sector SVS2 of the servo area SV includes a predetermined zone servo sector of the zone servo area ZSV0, a predetermined zone servo sector of the zone servo area ZSV1, and a predetermined zone servo sector of the zone servo area ZSV2. For example, the servo sector SVS2 includes the zone servo sector ZSVS11 of the zone servo area ZSV1 of the track TRn, the zone servo sector ZSVS21 of the zone servo area ZSVS2 of the track TRn, the zone servo sector ZSVS12 of the zone servo area ZSV1 of the track TRm, the zone servo sector ZSVS02 of the zone servo area ZSV0 of the track TRm, the zone servo sector of the zone servo area ZSV0 of the track TRz1, the zone servo sector of the zone servo area ZSV1 of the track TRz2, and the zone servo sector of the zone servo area ZSV2 of the track TRz3. The servo sector SVS2 includes a servo pattern SVP2. The servo pattern SVP2 is composed of at least one servo data element, for example, a preamble, a servo mark, a gray code, PAD, burst data, an additional pattern, and a post code X2. The post code X2 may be the same as or different from the post code X1 in FIG. 6.

In the servo pattern SVP2, the preamble, the servo mark, the gray code, the PAD, the burst data, the additional pattern, and the post code X2 are aligned in order of their description in the traveling direction d2. For example, in the servo pattern SVP2, the preamble, the servo mark, the gray code, the PAD, the burst data, the additional pattern, and the post code X2 are aligned in order of their description in the traveling direction d2. The servo sector SVS2 may not include the additional pattern or the post code X2.

FIG. 7 shows a length ASL2 of the servo sector SVS2 and a length PCLX2 of the post code X2. For example, the length ASL2 is longer than the length ASL0 in FIG. 5, and the length ASL2 is longer than the length ASL1 in FIG. 6. For example, the length PCLX2 may be the same as the length PCLX1 in FIG. 6, shorter than the length PCLX1 or longer than the length PCLX1.

As shown in FIG. 1, the driver IC 20 controls the driving of the SPM 12 and the VCM 14 under the control of the system controller 130 (more specifically, an MPU 60 to be described later).

The head amplifier IC (preamplifier) 30 comprises a read amplifier and a write driver. The read amplifier amplifies a read signal read from the disk 10 and outputs the amplified read signal to the system controller 130 (more specifically, a read/write (R/W) channel 40 to be described later). The write driver outputs to the head 15 a write current corresponding to a signal output from the R/W channel 40.

The volatile memory 70 is a semiconductor memory in which stored data is lost when power supply is cut off. The volatile memory 70 stores data and the like necessary for processing in each of the units of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. The buffer memory 90 may be constituted integrally with the volatile memory 70. The buffer memory 90 is, for example, a DRAM, a static random access memory (SRAM), an SDRAM, a ferroelectric random access memory (FeRAM), a magnetoresistive random access memory (MRAM) or the like.

The system controller (controller) 130 is realized by, for example, using a large scale integrated circuit (LSI) referred to as a system-on-a-chip (SoC) in which a plurality of elements are integrated on a single chip. The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the nonvolatile memory 80, the buffer memory 90, and the host 100.

In accordance with instructions from the MPU 60 to be described later, the R/W channel 40 executes signal processing, for example, modulation, demodulation, encoding, and decoding of the read data transferred from the disk 10 to the host 100 and the write data transferred from the host 100. The R/W channel 40 comprises a circuit or function that measures the signal quality of the read data. The R/W channel 40 detects various gates, for example, a write gate corresponding to a signal to write data, a read gate corresponding to a signal to read data, a servo gate corresponding to a signal to read servo, and the like. The R/W channel 40 executes the signal processing of the write data in accordance with the write gate, the signal processing of the read data in accordance with the read gate, and the signal processing of the servo data in accordance with the servo gate. The R/W channel 40 executes the servo read processing of demodulating servo data from the read signals input from the head amplifier IC 30, and executes processing of writing data to the disk 10 (processing of outputting write data to the head amplifier IC 30). The R/W channel 40 executes the servo read processing and read processing of reading data from the disk 10. The R/W channel 40 is electrically connected to, for example, the head amplifier IC 30, the HDC 50, the MPU 60 and the like.

For example, the R/W channel 40 servo-reads the servo sector in accordance with the servo gate of servo-reading the servo data of the servo sector as a whole in a predetermined area of the disk 10, and executes write processing to this area based on the servo data servo-read in accordance with this servo gate. The "servo gate that servo-reads the servo data of the servo sector as a whole" may be hereinafter referred to as a "normal servo gate". In addition, "executing the servo read processing in accordance with the normal servo gate" may be referred to as "normal servo read" or "normal servo read processing".

For example, the R/W channel 40 servo-reads the servo sector in accordance with the servo gate that servo-reads a part of the servo data of the servo sector, for example, the servo data in a circumferential range smaller than a circumferential range of the servo data that is servo-read by the normal servo gate, in a predetermined area of the disk 10, and executes the write processing in this area based on the servo data that is servo-read in accordance with this servo gate.

The "servo gate that servo-reads a part of the servo data of the servo sector, for example, the servo data in a circumferential range smaller than a circumferential range of the servo data that is servo-read by the normal servo gate" may be hereinafter referred to as a "short servo gate". In addition, "executing the servo read processing in accordance with the short servo gate" may be referred to as "short servo read" or "short servo read processing".

The normal servo gate and the short servo gate are different with respect to the length of time (hereinafter often referred to as a servo gate length) between the assertion (active, valid, or ON) state and the negation (inactive, invalid, or OFF) state. For example, the servo gate length of the normal servo gate is longer than the servo gate length of a short servo gate.

For example, the R/W channel 40 executes normal servo-reading of the servo sector in a predetermined area of the disk 10, and executes the read processing of this area based on the servo data subjected to the normal servo-reading.

For example, the R/W channel 40 may execute short servo-reading of the servo sector in a predetermined area of the disk 10, and execute the read processing in this area based on the servo data subjected to the short servo reading.

The R/W channel 40 executes the normal servo-read processing in a predetermined area of the disk 10. The R/W channel 40 can switch executing and not executing the short servo-read processing in a predetermined area of the disk 10. The "mode of executing the short servo read processing" may be referred to as the "short servo mode". In addition, "executing the short servo read processing" may also be referred to as "turning on the short servo mode", and "not executing the short servo read processing" may also be referred to as "turning off the short servo mode". In other words, the R/W channel 40 can switch turning on and off the short servo mode.

For example, the R/W channel 40 may switch turning on and off the short servo mode, depending on the mode of executing the write processing (hereinafter often referred to as "write mode") or the mode of executing the read processing (hereinafter often referred to as "read mode"). In the following descriptions, the "write mode" and the "read mode" may be collectively referred to as "access mode". The term "access" implies "recording or writing data to a predetermined area of the disk 10", "reading data from a predetermined area of the disk 10", "moving the head 15 or the like to a predetermined area of the disk 10", and the like. In other words, the R/W channel 40 may switch turning on and off the short servo mode in accordance with the access mode.

The HDC 50 controls data transfer between the host 100 and the R/W channel 40 in response to instructions from the MPU 60 to be described later. In accordance with instructions from the MPU 60 to be described later, the HDC 50 outputs various gates, for example, a write gate, a read gate, a servo gate, and the like to the R/W channel 40. For example, the HDC 50 generates a normal servo gate and outputs the normal servo gate to the R/W channel 40. For example, the normal servo gate corresponds to a gate for reading at least the preamble, the servo mark, the gray code, the PAD, and the burst data. For example, the HDC 50 generates a short servo gate and outputs the short servo gate to the R/W channel 40. The short servo gate corresponds to a gate for reading at least the burst data without reading at least the preamble, the servo mark, the gray code, and the PAD. The HDC 50 is electrically connected to, for example, the R/W channel 40, the MPU 60, the volatile memory 70, the nonvolatile memory 80, the buffer memory 90, and the like.

The MPU 60 is a main controller that controls each of the units of the magnetic disk device 1. The MPU 60 controls the VCM 14 via the driver IC 20 and executes servo control for positioning the head 15. In addition, the MPU 60 controls the SPM 12 via the driver IC 20 to rotate the disk 10. The MPU 60 controls the operation of writing data to the disk 10 and selects a storage destination of the write data. In addition, the MPU 60 controls the operation of reading data from the disk 10 and controls the processing of read data.

Moreover, the MPU 60 manages the area where data is recorded. The MPU 60 is connected to each of the units of the magnetic disk device 1. The MPU 60 is electrically connected to, for example, the driver IC 20, the R/W channel 40, the HDC 50 and the like.

FIG. 8 is a block diagram showing an example of a configuration of the head 15, the head amplifier IC 30, and the system controller 130 shown in FIG. 1. The MPU 60 includes a read/write control unit 610 and a servo pattern management unit 620.

As shown in FIG. 8, the R/W channel 40 includes a gate detection unit 410. The gate detection unit 410 detects whether various gates, for example, the write gate, the read gate, the servo gate, and the like are in an asserted or negated state.

For example, the gate detection unit 410 executes the write processing when detecting that the write gate is asserted, and stops the write processing when detecting that the write gate is negated. The gate detection unit 410 executes the read processing when detecting that the read gate is asserted, and stops the read processing when detecting that the read gate is negated. The gate detection unit 410 executes the servo read processing when detecting that the servo gate is asserted, and stops the servo read processing when detecting that the servo gate is negated. The gate detection unit 410 may be provided inside the HDC 50 or the MPU 60.

The HDC 50 includes a gate generation unit 510. In accordance with commands from the host 100, instructions from the MPU 60, and the like, the gate generation unit 510 generates various gates, for example, a write gate, a read gate, a servo gate, and the like, and outputs the gates to the R/W channel 40, for example, the gate detection unit 410. In the following descriptions, "raising a predetermined gate" may be referred to as "asserting a predetermined gate". In addition, "lowering a predetermined gate" may be referred to as "negating the predetermined gate". In addition, "asserting a predetermined gate" and "negating a predetermined gate" may imply the meaning "generating a predetermined gate". The gate generation unit 510 may be included in the R/W channel 40 or the MPU 60.

For example, the gate generation unit 510 generates a normal servo gate and outputs the normal servo gate to the gate detection unit 410. For example, the gate generation unit 510 generates a plurality of normal servo gates and outputs the plurality of normal servo gates to the gate detection unit 410.

For example, when the short servo mode is ON, the gate generation unit 510 generates the normal servo gate and the short servo gate, and outputs the normal servo gate and the short servo gate to the gate detection unit 410.

For example, when the short servo mode is OFF, the gate generation unit 510 generates the normal servo gate and outputs the normal servo gate to the gate detection unit 410. For example, when the short servo mode is OFF, the gate generation unit 510 generates a plurality of normal servo gates and outputs the plurality of normal servo gates to the gate detection unit 410.

Figure 9:
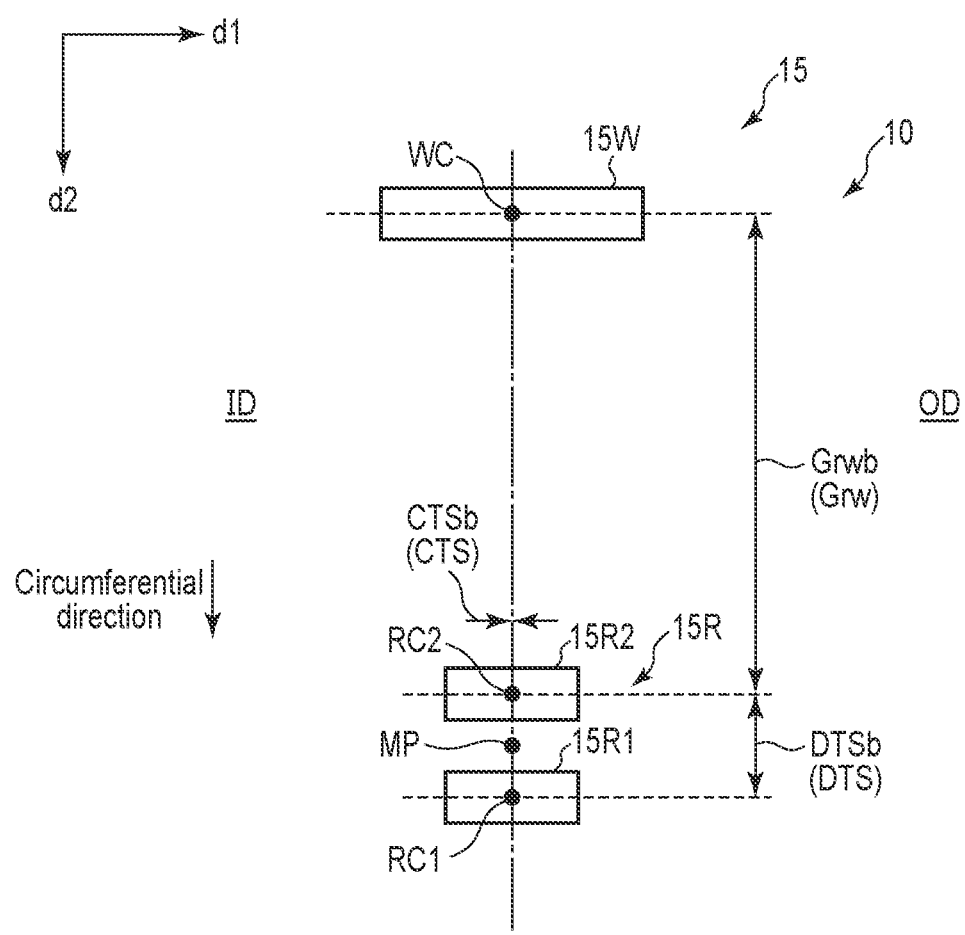
FIG. 9 is a schematic diagram showing an example of a geometric arrangement of a write head and two read heads in a case of positioning the read head at a reference position in the magnetic disk device.

FIG. 9 is a schematic diagram showing an example of the geometric arrangement of the write head 15W and two read heads 15R1 and 15R2 in a case where the read head 15R1 is positioned at a reference position (for example, a radial position of the middle circumferential area MR) in the magnetic disk device 1.

FIG. 9 shows a central part WC of the write head 15W, a central part RC1 of the read head 15R1, a central part RC2 of the read head 15R2, and an intermediate part MP located between the central part RC1 of the read head 15R1 and the central part RC2 of the read head 15R2.

A circumferential interval between the central part RC1 of the read head 15R1 and the central part RC2 of the read head 15R2 may be hereinafter referred to as a down track separation (DTS). The radial interval between the central part RC1 of the read head 15R1 and the central part RC2 of the read head 15R2 may also be referred to as a cross track separation (CTS). The interval between the read head 15R and the write head 15W, for example, the circumferential interval between the central part RC1 of the read head 15R1 and the central part WC of the write head 15W, the circumferential interval between the central part RC2 of the read head 15R2 and the central part WC of the write head 15W, and the circumferential interval between the intermediate part MP and the central part WC of the write head 15W may be referred to as a read/write gap.

The circumferential interval between the central part RC2 of the read head 15R2 and the central part WC of the write head 15W will be hereinafter described as a read/write gap Grw. For convenience of description, the "central part of the write head" and "each part of the write head" may be simply referred to as the "write head", and the "central part of the read head", the "intermediate part of two read heads among a plurality of read heads", and "each part of the read head" may be simply referred to as the "read head".

In the example shown in FIG. 9, the write head 15W, the read head 15R2, the intermediate part MP, and the read head 15R1 are aligned in the traveling direction d2 when the read head 15R1 is arranged at the reference position. When the read head 15R1 is arranged at the reference position, the read/write gap Grw is a distance Grwb. When the read head 15R1 is arranged at the reference position, the down track separation DTS is a distance DTSb.

The distance Grwb corresponds to a linear distance from the central part WC to the central part RC2. The distance DTSb corresponds to a linear distance from the central part RC2 to the central part RC1.

In the example shown in FIG. 9, when the read head 15R1 is arranged at the reference position, the write head 15W, the read head 15R1, the read head 15R2, and the intermediate part MP are not displaced in the radial direction d1. When the read head 15R1 is arranged at the reference position, the cross track separation CTS is a distance CTSb, and the distance CTSb=0. When the read head 15R1 is arranged at the reference position, each of the write head 15W, the read head 15R1, the read head 15R2, and the intermediate part MP may be displaced in the radial direction d1.

Figure 10:
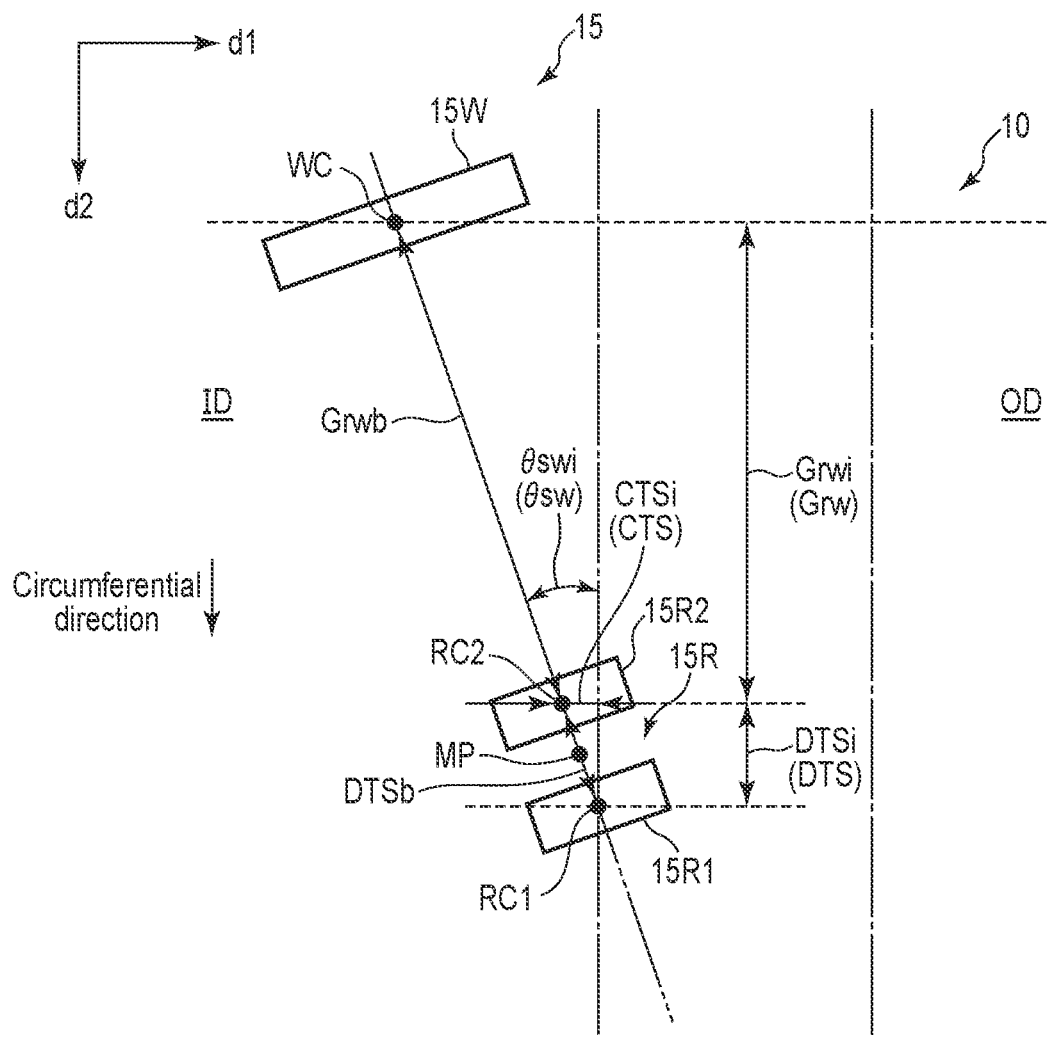
FIG. 10 is a schematic diagram showing an example of a geometric arrangement of a write head and two read heads in a case of positioning the read head at a radius position in the magnetic disk device.

FIG. 10 is a schematic diagram showing an example of the geometric arrangement of the write head 15W and two read heads 15R1 and 15R2 in a case where the read head 15R1 is located at the radial position of the inner circumferential area IR (for example, the radial position of the inner circumferential area IR) in the magnetic disk device 1.

As shown in FIG. 10, the central part RC1, the central part RC2, and the central part WC are located on the side of an inner circumference ID of the disk 10 from the reference position. The radial position of the inner circumferential area IR is also located on the inner circumference ID side from the reference position.

When the read head 15R1 is arranged at the radial position of the inner circumferential area IR, the write head 15W, the read head 15R1, the read head 15R2, and the intermediate part MP (head 15) are tilted toward the inner circumstance ID side at a skew angle θsw=θswi with respect to the axis extending in the circumferential direction. When the read head 15R1 is arranged at the radial position of the inner circumferential area IR, the read/write gap Grw is a distance Grwi. When the read head 15R1 is arranged at the radial position of the inner circumferential area IR, the down track separation DTS is a distance DTSi.

It should be noted that Grwi=Grwb×cos θswi and DTSi=DTSb×cos θswi.

In the example shown in FIG. 10, when the read head 15R1 is arranged at the radial position of the inner circumferential area IR, the write head 15W, the read head 15R1, the read head 15R2, and the intermediate part MP are displaced in the radial direction d1. When the read head 15R1 is arranged at the radial position of the inner circumferential area IR, the cross track separation CTS is a distance CTSi.

It should be noted that CTSi=DTSb×sin θswi.

Figure 11:
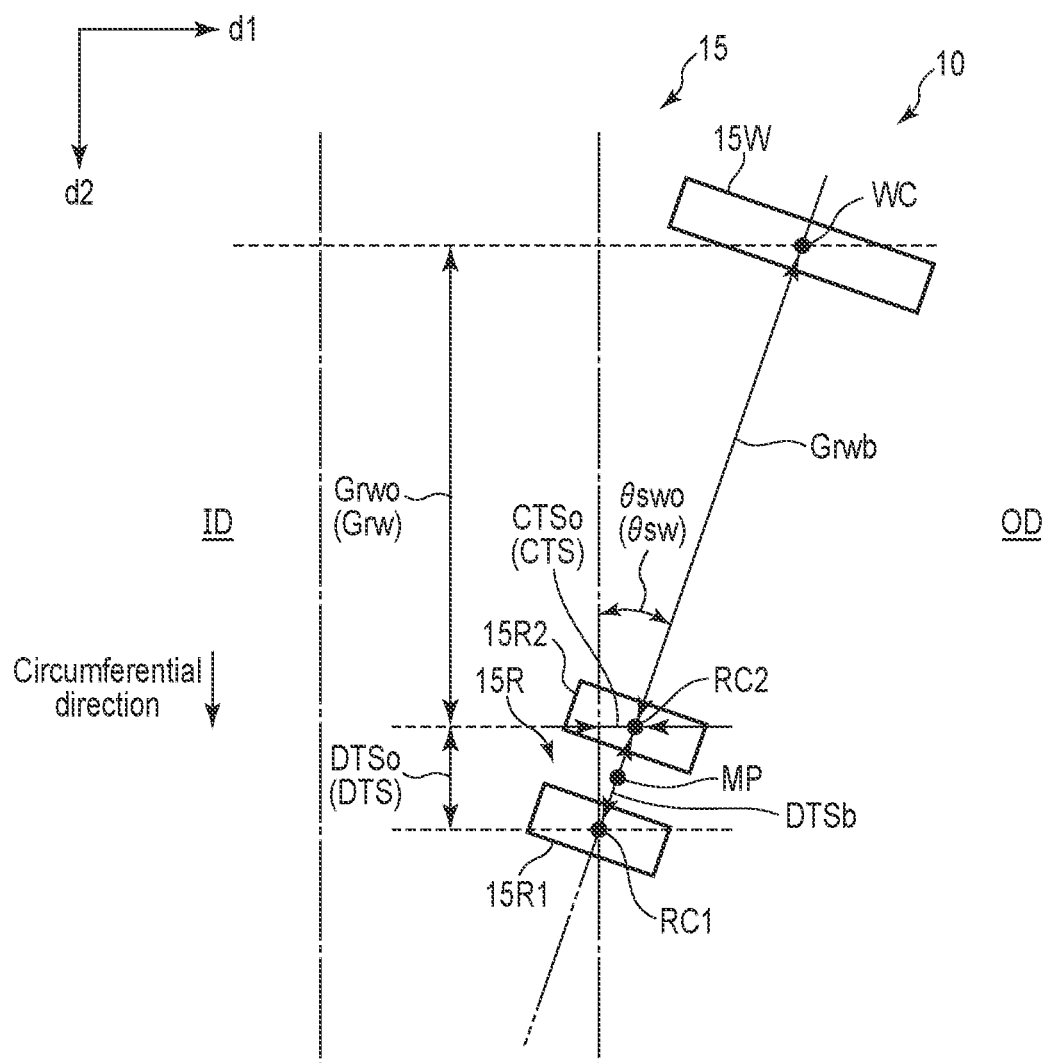
FIG. 11 is a schematic diagram showing an example of a geometric arrangement of a write head and two read heads in a case of positioning the read head at a radius position in the magnetic disk device.

FIG. 11 is a schematic diagram showing an example of the geometric arrangement of the write head 15W and two read heads 15R1 and 15R2 in a case where the read head 15R1 is located at the radial position of the outer circumferential area OR (for example, the radial position of the outer circumferential area OR) in the magnetic disk device 1.

As shown in FIG. 11, the central part RC1, the central part RC2, and the central part WC are located on the outer circumferential OD side of the disk 10 from the reference position. The radial position of the outer circumferential area OR is also located on the outer circumferential OD side from the reference position.

In the example shown in FIG. 11, when the read head 15R1 is arranged at the radial position of the outer circumferential area OR, the write head 15W, the read head 15R1, the read head 15R2, and the intermediate part MP (head 15) are tilted toward the outer circumference OD side at a skew angle θsw=θswo with respect to the axis extending in the circumferential direction. When the read head 15R1 is arranged at the radial position of the outer circumferential area OR, the read/write gap Grw is a distance Grwo. When the read head 15R1 is arranged at the radial position of the outer circumferential area OR, the down track separation DTS is a distance DTSo.

It should be noted that Grwo=Grwb×cos θswo and DTSo=DTSb×cos θswo.

In the example shown in FIG. 11, when the read head 15R1 is arranged at the radial position of the outer circumferential area OR, the write head 15W, the read head 15R1, the read head 15R2, and the intermediate part MP are displaced in the radial direction d1. When the read head 15R1 is arranged at the radial position of the outer circumferential area OR, the cross track separation CTS is a distance CTSo.

It should be noted that CTSo=DTSb×sin θswo.

Figure 12:
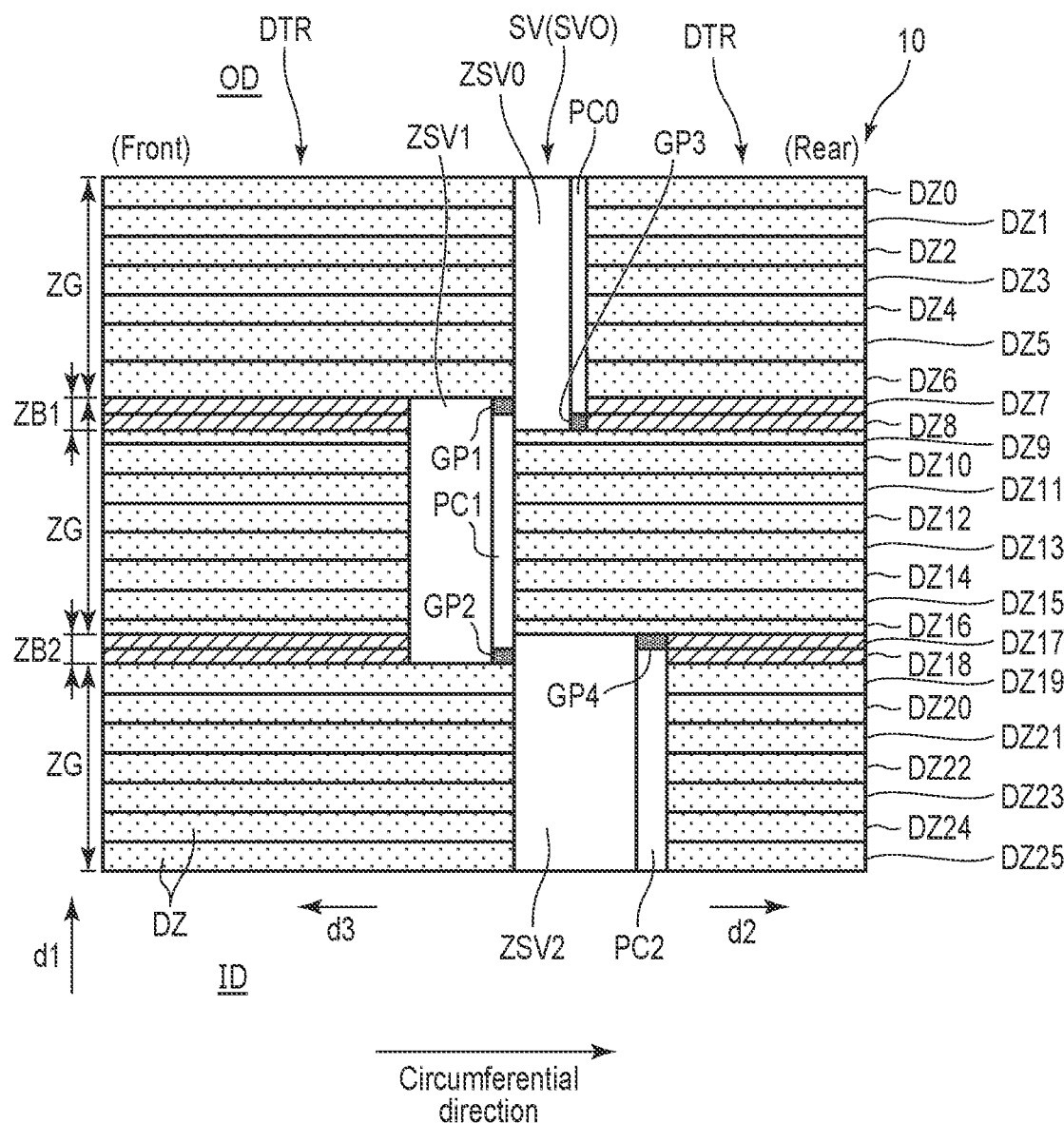
FIG. 12 is a schematic diagram partially showing areas in a circumferential direction of the disk shown in FIG. 2, illustrating one main servo area and two data areas.

Next, several areas of the disk 10 will be described. FIG. 12 is a schematic diagram showing several areas in the circumferential direction of the disk 10 shown in FIG. 2, illustrating one main servo area SVO and two data areas DTR.

As shown in FIG. 12, the main servo area SVO, which is the servo area SV, includes a plurality of zone servo areas ZSV0, ZSV1, and ZSV2. Each of the zone servo areas ZSV0, ZSV1, and ZSV2 includes servo data other than a post code.

A post code area PC0 is located behind the zone servo area ZSV0 and is adjacent to the zone servo area ZSV0. A post code in the post code area PC0 is used to correct the position of the head 15 when the servo data in the zone servo area ZSV0 is demodulated.

A post code area PC1 is located behind the zone servo area ZSV1 and is adjacent to the zone servo area ZSV1. A post code in the post code area PC1 is used to correct the position of the head 15 when the servo data in the zone servo area ZSV1 is demodulated.

A post code area PC2 is located behind the zone servo area ZSV2 and is adjacent to zone servo area ZSV2. A post code in the post code area PC2 is used to correct the position of the head 15 when the servo data in the zone servo area ZSV2 is demodulated.

In the main servo area SVO, a plurality of single zone servo areas ZG and a plurality of double zone servo areas ZB are aligned in the radial direction d1. Each of the single zone servo areas ZG is an area where the plurality of zone servo areas ZSV are not aligned in the circumferential direction, and each of the double zone servo areas ZB is an area where the plurality of zone servo areas ZSV are aligned in the circumferential direction.

The zone servo area ZSV2 and the post code area PC2 have the same servo frequency, the zone servo area ZSV1 and the post code area PC1 have the same servo frequency, and the zone servo area ZSV0 and the post code area PC0 have the same servo frequency.

The servo frequency of the zone servo area ZSV1 and the post code area PC1 is larger than the servo frequency of the zone servo area ZSV2 and the post code area PC2. The servo frequency of the zone servo area ZSV0 and the post code area PC0 is larger than the servo frequency of the zone servo area ZSV1 and the post code area PC1.

Each of the data areas DTR includes a plurality of data zone areas DZ. When focusing the data area DTR located behind the main servo area SVO, the data area DTR includes a plurality of data zone areas DZ from a data zone area DZ0 on the outer circumference OD side to a data zone area DZ25 on the inner circumference ID side.

In the figure, a plurality of data zone areas DZ adjacent to the single zone servo area ZG are marked with dot patterns, in the circumferential direction, and the plurality of data zone areas DZ adjacent to the double zone servo area ZB are marked with right ascending diagonal lines.

When focusing the areas passing through a data zone area DZ7 in the circumferential direction, the data zone areas DZ, the zone servo area ZSV1, the gap GP (GP1), the zone servo area ZSV0, the post code area PC0, and the data zone area DZ7 are aligned in order in the traveling direction d2. The gap GP1 includes the gap GP11 shown in FIG. 4.

When focusing the areas passing through a data zone area DZ8 in the circumferential direction, the data zone areas DZ, the zone servo area ZSV1, the post code area PC1, the zone servo area ZSV0, the gap GP (GP3), and the data zone area DZ8 are aligned in order in the traveling direction d2.

When focusing the areas passing through a data zone area DZ17 in the circumferential direction, the data zone areas DZ, the zone servo area ZSV1, the post code area PC1, the zone servo area ZSV2, the gap GP (GP4), and the data zone area DZ17 are aligned in order in the traveling direction d2.

When focusing the areas passing through a data zone area DZ18 in the circumferential direction, the data zone areas DZ, the zone servo area ZSV1, the gap GP (GP2), the zone servo area ZSV2, the post code area PC2, and the data zone area DZ18 are aligned in order in the traveling direction d2. The gap GP2 includes the gap GP21 shown in FIG. 3.

In the figure, the gaps GP1 through GP4 are marked with dot patterns more densely than the data zone areas DZ.

According to the magnetic disk device 1 of the comparative example configured as described above, the magnetic disk device 1 is considered to be a device employing the zone servo, utilizing the double zone servo areas ZB as specific data areas. The linear velocity of the head 15 with respect to the disk 10 is higher at the radial position on the outer circumference OD side than at the radial position on the inner circumference ID side. For this reason, a format efficiency can be improved by making the servo frequency of the servo areas on the outer circumference OD side larger than the servo frequency of the servo areas on the inner circumference ID side, on the disk 10, as described above.

In the double zone servo area ZB1, the zone servo area ZSV1 on the front side and the zone servo area ZSV0 on the rear side are aligned in the circumferential direction. In the double zone servo area ZB2, the zone servo area ZSV1 on the front side and the zone servo area ZSV2 on the rear side are aligned in the circumferential direction.

To write the post code to the post code area PC1, the gap GP1 is secured between the zone servo area ZSV1 and the zone servo area ZSV0, and the gap GP2 is secured between the zone servo area ZSV1 and the zone servo area ZSV2. In other words, a situation that the servo data of the zone servo area ZSV0 may be erased when writing the post code to the post code area PC1 can be avoided by the gap GP1. In addition, a situation that the servo data of the zone servo area ZSV2 may be erased when writing the post code to the post code area PC1 can be avoided by the gap GP2.

In the comparative example, since the gaps GP1 and GP2 exist in the double zone servo areas ZB, the servo occupancy rate in the double zone servo areas increases and the data amount in the double zone servo areas ZB decreases. If the gaps GP1 and GP2 can be eliminated, the data amount in the double zone servo areas ZB can be increased. However, if the gaps GP1 and GP2 are eliminated, the post code cannot be written to the post code area PC1 immediately after the burst data included in the zone servo area ZSV1 on the front side.

Therefore, to solve the problem in the comparative example, a magnetic disk device capable of lowering the the servo occupancy ratio in the double zone servo area and improving the data formatting efficiency by reducing the gaps in the double zone servo areas, can be obtained, in embodiments to be described later. For example, a magnetic disk device employing a servo format in which the post code area is not provided immediately after the zone servo area on the front side, but immediately after the zone servo area on the rear side, in the double zone servo area of the embodiments to be described below, can be obtained. In addition, a magnetic disk device employing an adjacent data format that does not erase the post code in the above post code area can be obtained. Next, the means and methods for solving the above problem will be described. These means and methods are used for the servo format of the double zone servo areas and the data format of the data areas.

First Embodiment

Figure 13:
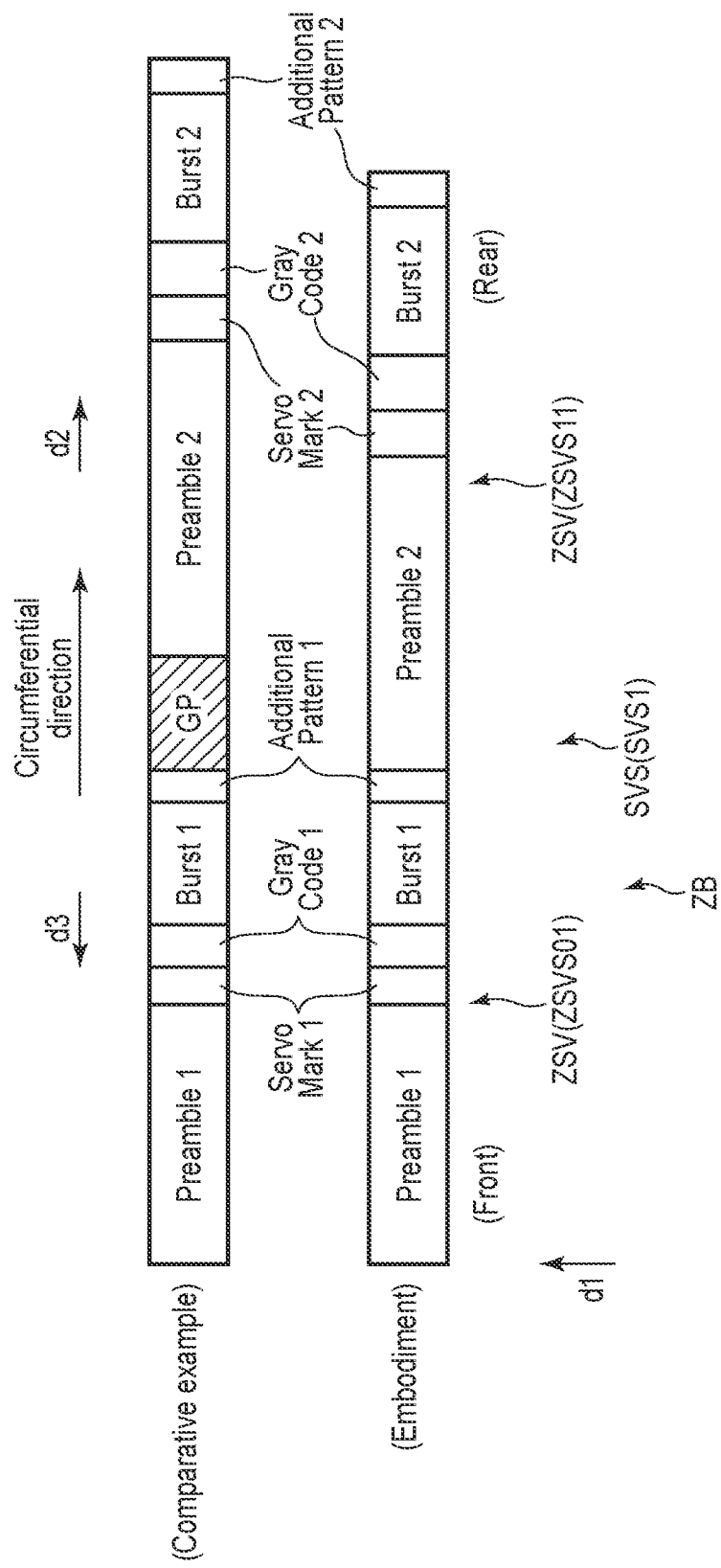
FIG. 13 is a schematic diagram illustrating a servo sector of a double-zone servo area of a disk of the magnetic disk device according to the first embodiment.

Next, a first embodiment will be described. The magnetic disk device 1 is configured in the same manner as the above-described comparative example except for constituent elements to be described in this embodiment. FIG. 13 is a schematic diagram illustrating a servo sector SVS1 of a double-zone servo area ZB of a disk 10 of the magnetic disk device 1 according to this embodiment. The servo sector SVS1 of the comparative example is also shown for comparison with the servo sector SVS1 of this embodiment, in FIG. 13.

As shown in FIG. 13, the gap GP exists between the zone servo sector ZSVS01 and the zone servo sector ZSVS11 in the servo sector SVS1 of the comparative example. In contrast, the gap between the zone servo sector ZSVS01 and the zone servo sector ZSVS11 is eliminated in the servo sector SVS1 of this embodiment. FIG. 13 shows an example of a servo pattern of a servo sector of a track in the double zone servo area ZB before writing in the post code. The zone servo sector ZSVS01 on the front side includes a preamble 1, a servo mark 1, a gray code 1, burst data 1, and an additional pattern 1. The zone servo sector ZSVS11 on the rear side includes a preamble 2, a servo mark 2, a gray code 2, burst data 2, and an additional pattern 2.

In the servo sector SVS1 of the comparative example, the preamble 1, the servo mark 1, the gray code 1, the burst data 1, the additional pattern 1, the gap GP, the preamble 2, the servo mark 2, the gray code 2, the burst data 2, and the additional pattern 2 are aligned in order in the traveling direction d2. The additional pattern 1 and the additional pattern 2 are patterns for detecting whether or not the read timing is shifted when demodulating the servo data of the short servo sector in a short servo device. If a short servo device is not provided, i.e., if each of all servos is a normal servo, the additional pattern 1 and the additional pattern 2 may be omitted.

In contrast, in the servo sector SVS1 of this embodiment, the preamble 1, the servo mark 1, the gray code 1, the burst data 1, the additional pattern 1, the preamble 2, the servo mark 2, the gray code 2, the burst data 2, and the additional pattern 2 are aligned in order in the traveling direction d2. The preamble 2 is arranged adjacent to the additional pattern 1 by reducing the gap GP. If a short servo device is not provided, the preamble 2 may be arranged adjacent to the burst data 1.

FIG. 14 is a schematic diagram illustrating an example of front side servo read processing in the double zone servo area ZB of the disk 10 according to this embodiment. FIG. 14 shows the arrangement of the servo pattern and the post code, and the like. In addition, FIG. 14 also shows a servo pattern in which the post code 1 for the zone servo sector ZSVS01 is located after the burst data 2 when the zone servo sector ZSVS01 on the front side is read (i.e., the head 15 is positioned using the demodulated data of the zone servo sector ZSVS01 on the front side) in the double zone servo area ZB where the gaps GP are reduced.

As shown in FIG. 14, the post code 1 is arranged behind the burst data 2 and adjacent to the burst data 2. The post code 1 is overwritten by the additional pattern 2 shown in FIG. 13. A servo frequency of the post code 1 is different from a servo frequency of the preamble 2 on the rear side. A servo frequency of the preamble 1 on the front side is equal to the servo frequency of the post code 1.

In the FIG. 13, the zone servo sector ZSVS01 is arranged on the outer circumference OD side from the zone servo sector ZSVS11, and the servo frequency of the zone servo sector ZSVS01 is higher than that of the zone servo sector ZSVS11. For example, the servo frequency of the zone servo sector ZSVS01 is 400 MHz, and the servo frequency of the zone servo sector ZSVS11 is 300 MHz. Note that, the zone servo sector ZSVS01 is arranged on the inner circumference ID side from the zone servo sector ZSVS11, and the servo frequency of the zone servo sector ZSVS01 is smaller than that of the zone servo sector ZSVS11.

The servo gate is asserted at timing T31 corresponding to the preamble 1, and is negated at timing T32 corresponding to the post code 1. The preamble 1, the servo mark 1, the gray code 1, the burst data 1, and the additional pattern 1 of the zone servo sector ZSVS01 on the front side, and the post code 1 can be thereby read. The preamble 1, the servo mark 1, the gray code 1, the burst data 1, the additional pattern 1, and the post code 1 can demodulate appropriate servo data by specifying timing within a period when the servo gate is in the asserted state, for example, timing based on the servo gate on.

Writing can be executed until the time just before timing T31 by setting the timing T31 in the middle of the preamble 1 as shown in FIG. 14. In contrast, since writing and reading are not executed during the period when the head 15 is in seek, the timing T31 may be on the front end side of the preamble 1 in the example shown in FIG. 14.

The RRO gate for reading the post code 1 is asserted at timing T33 corresponding to a front end of the post code 1 and negated at timing T34 corresponding to a rear end of the post code 1. The post code 1 can be thereby read. The timing T32 may be simultaneous with the timing T34 or may be timing set after the timing T34.

FIG. 15 is a schematic diagram illustrating an example of the rear side servo read processing in the double zone servo area ZB of the disk 10 according to this embodiment. FIG. 15 shows the arrangement of the servo pattern and the post code, and the like. In addition, FIG. 15 also shows a servo pattern in which the post code 2 for the zone servo sector ZSVS12 is arranged after the burst data 2 when the zone servo sector ZSVS12 on the rear side is read (i.e., the head 15 is positioned using the demodulated data of the zone servo sector ZSVS12 on the rear side) in the double zone servo area ZB where the gaps GP are reduced.

As shown in FIG. 15, the post code 2 is arranged behind the burst data 2 and adjacent to the burst data 2. A servo frequency of the post code 2 is the same as a servo frequency of the preamble 2 on the rear side.

The servo gate is asserted at timing T41 corresponding to the preamble 2, and is negated at timing T42 corresponding to the post code 2. The preamble 2, the servo mark 2, the gray code 2, and the burst data 2 of the zone servo sector ZSVS12 on the rear side, and the post code 2 can be thereby read.

The RRO gate for reading the post code 2 is asserted at timing T43 corresponding to the front end of the post code 2 and is negated at timing T44 corresponding to the rear end of the post code 2. The post code 2 can be thereby read. The timing T42 may be simultaneous with the timing T44 or may be a timing after the timing T44.

FIG. 16 is a schematic diagram illustrating an example of servo read processing in a single zone servo area ZG of the disk 10 according to the first embodiment. FIG. 16 shows the arrangement of the servo pattern and the post code, and the like. In addition, FIG. 16 also shows a servo pattern in which a post code 3 is arranged behind the burst data 3 when reading the servo pattern of the single zone servo area ZG (i.e., positioning the head 15 using the demodulated data of the single zone servo area ZG).

As shown in FIG. 16, a preamble 3, a servo mark 3, a gray code 3, the burst data 3, and the post code 3 of a servo sector SVS3 of the single zone servo area ZG are aligned in order in the traveling direction d2. A servo frequency of the post code 3 is the same as a servo frequency of the preamble 3.

The servo gate is asserted at timing T51 corresponding to the preamble 3 and is negated at timing T52 corresponding to the post code 3. The preamble 3, the servo mark 3, the gray code 3, the burst data 3, and the post code 3 can be thereby read.

The RRO gate for reading the post code 3 is asserted at timing T53 corresponding to the front end of the post code 3 and is negated at timing T54 corresponding to the rear end of the post code 3. The post code 3 can be thereby read. The timing T52 may be simultaneous with the timing T54 or may be timing set after the timing T54.

Figure 17:
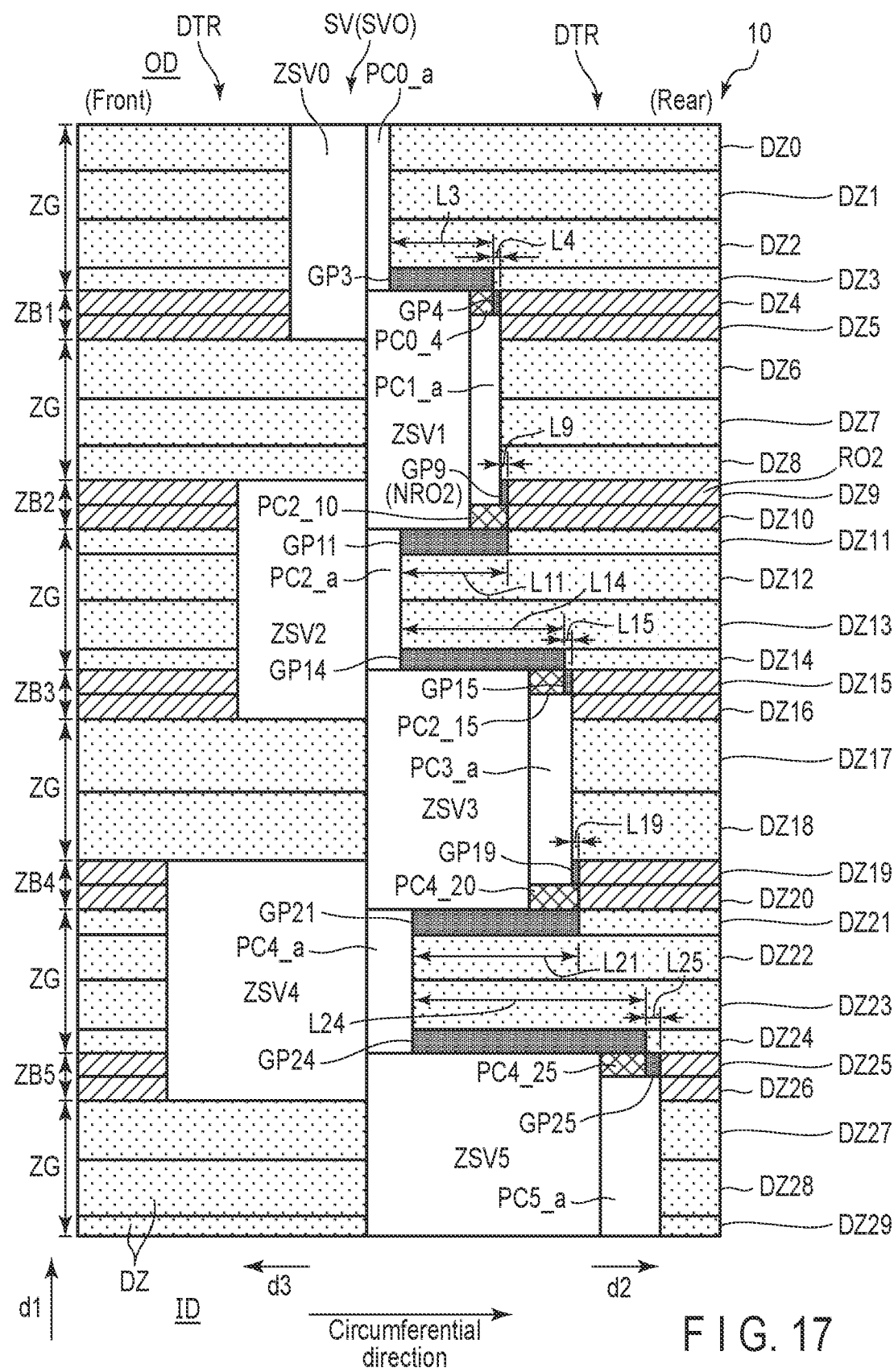
FIG. 17 is a schematic diagram partially showing the areas in the circumferential direction of the disk according to the first embodiment, illustrating one main servo area and two data areas.

Next, several areas of the disk 10 will be described. FIG. 17 is a schematic diagram showing several areas in the circumferential direction of the disk 10 according to this embodiment, illustrating one main servo area SVO and two data areas DTR. In the figure, a plurality of data zone areas DZ adjacent to the single zone servo area ZG are marked with dot patterns, in the circumferential direction, and the plurality of data zone areas DZ adjacent to the double zone servo area ZB are marked with right ascending diagonal lines. The gaps GP are marked with dot patterns more densely than the data zone areas DZ.

As shown in FIG. 17, the main servo area SVO, which is the servo area SV, includes a plurality of zone servo areas, for example, six zone servo areas ZSV0, ZSV1, ZSV2, ZSV3 ZSV4, and ZSV5. The number of zone servo areas may be other than six. Each of the zone servo areas ZSV0 to ZSV5 includes servo data other than the post code. In the main servo area SVO, a plurality of single zone servo areas ZG and a plurality of double zone servo areas ZB are aligned in the radial direction d1.

In each of the double zone servo areas ZB1, ZB2, ZB3, ZB4, and ZB5, the zone servo area on the front side and the zone servo area on the rear side are aligned in order in the traveling direction d2 and are adjacent to each other. In each of the double zone servo areas ZB1 to ZB5, no gap exists between the zone servo area on the front side and the zone servo area on the rear side (gap=0), or very small gap exists between the zone servo area on the front side and the zone servo area on the rear side (for example, the very small gap is shorter than the PostCode length to be written after the burst2 of the zone servo area on the rear side). For this reason, the servo occupancy ratio of the double zone servo areas ZB can be lowered and the data formatting efficiency can be improved in the magnetic disk device 1 according to this embodiment.

In the single-zone servo area ZG, each of postcode areas PC0_a, PC1_a, PC2_a, PC3_a, PC4_a, and PC5_a is located behind the corresponding zone servo area ZSV and is adjacent to the corresponding zone servo area ZSV. A post code of each of the post code areas PC0_a, PC1_a, PC2_a, PC3_a, PC4_a, and PC5_a is used to correct the position of the head 15 when the servo data of the corresponding zone servo area ZSV is demodulated.

For example, in the single zone servo area ZG, the post code area PC0_a is located behind the zone servo area ZSV0 and is adjacent to the zone servo area ZSV0. A post code of the post code area PC0_a is used to correct the position of the head 15 when the servo data of the zone servo area ZSV0 is demodulated.

In the double zone servo area ZB, each of the post code areas PC1_a, PC3_a, and PC5_a for the zone servo areas ZSV on the rear side is located behind the corresponding zone servo area ZSV on the rear side and is adjacent to the corresponding zone servo area ZSV on the rear side. A post code of each of the post code areas PC1_a, PC3_a, and PC5_a is used to correct the position of the head 15 when the servo data of the corresponding zone servo area ZSV on the rear side is demodulated.

For example, in the double zone servo area ZB, the post code area PC1_a for the zone servo area ZSV1 is located behind the zone servo area ZSV1 and is adjacent to the zone servo area ZSV1. A post code of the post code area PC1_a is used to correct the position of the head 15 when the servo data of the zone servo area ZSV1 is demodulated.

In the double zone servo area ZB, each of post code areas PC0_4, PC2_10, PC2_15, PC4_20, and PC4_25 for the zone servo areas ZSV on the front side is located behind the zone servo area ZSV on the rear side and is adjacent to the zone servo area ZSV on the rear side. For example, each of the post code areas PC0_4, PC2_10, PC2_15, PC4_20, and PC4_25 is located behind the burst area of the zone servo area ZSV on the rear side and is adjacent to the burst area. Each of the post code areas PC0_4, PC2_10, PC2_15, PC4_20, and PC4_25 is used to correct the position of the head 15 when the servo data of the corresponding zone servo area ZSV on the front side is demodulated.

In the area passing through the data zone area DZ4 in the circumferential direction, the post code area PC0_4 for the zone servo area ZSV0 is located behind the zone servo area ZSV1 (for example, the burst area of the zone servo area ZSV1). In the area passing through the data zone area DZ10 in the circumferential direction, the post code area PC2_10 for the zone servo area ZSV2 is arranged behind the zone servo area ZSV1 (for example, the burst area of the zone servo area ZSV1). In the area passing through the data zone area DZ15 in the circumferential direction, the post code area PC2_15 for the zone servo area ZSV2 is arranged behind the zone servo area ZSV3 (for example, the burst area of the zone servo area ZSV3). In the area passing through the data zone area DZ20 in the circumferential direction, the post code area PC4_20 for the zone servo area ZSV4 is arranged behind the zone servo area ZSV3 (for example, the burst area of the zone servo area ZSV3). In the area passing through the data zone area DZ25 in the circumferential direction, the post code area PC4_25 for the zone servo area ZSV4 is arranged behind the zone servo area ZSV5 (for example, the burst area of the zone servo area ZSV5).

The zone servo area ZSV0, the post code area PC0_a, and the post code area PC0_4 have the same first servo frequency. The zone servo area ZSV1 and the post code area PC1_a have the same second servo frequency. The zone servo area ZSV2, the post code area PC2_a, the post code area PC2_10, and the post code area PC2_15 have the same third servo frequency. The zone servo area ZSV3 and the post code area PC3_a have the same fourth servo frequency. The zone servo area ZSV4, the post code area PC4_a, the post code area PC4_20, and the post code area PC4_25 have the same fourth servo frequency. The zone servo area ZSV5 and the post code area PC5_a have the same sixth servo frequency.

The first servo frequency is larger than the second servo frequency. The second servo frequency is larger than the third servo frequency. The third servo frequency is larger than the fourth servo frequency. The fourth servo frequency is larger than the fifth servo frequency. The fifth servo frequency is larger than the sixth servo frequency.

Each of the data areas DTR includes a plurality of data zone areas DZ. When focusing the data area DTR located behind the main servo area SVO in the third rotational direction d3, the data area DTR includes a plurality of data zone areas DZ from a data zone area DZ0 on the outer circumference OD side to a data zone area DZ29 on the inner circumference ID side.

When focusing the areas passing through a data zone area DZ3 in the circumferential direction, the data zone areas DZ, the zone servo area ZSV0, the post code area PC0_a, the gap GP (GP3), and the data zone area DZ3 are aligned in order in the traveling direction d2.

When focusing the areas passing through a data zone area DZ4 in the circumferential direction, the data zone areas DZ, the zone servo area ZSV0, the zone servo area ZSV1, the post code area PC0_4, the gap GP (GP4), and the data zone area DZ4 are aligned in order in the traveling direction d2.

When focusing the areas passing through a data zone area DZ9 in the circumferential direction, the data zone areas DZ, the zone servo area ZSV2, the zone servo area ZSV1, the post code area PC1_a, the gap GP (GP9), and the data zone area DZ9 are aligned in order in the traveling direction d2.

When focusing the areas passing through a data zone area DZ11 in the circumferential direction, the data zone areas DZ, the zone servo area ZSV2, the post code area PC2_a, the gap GP (GP11), and the data zone area DZ11 are aligned in order in the traveling direction d2.

When focusing the areas passing through a data zone area DZ14 in the circumferential direction, the data zone areas DZ, the zone servo area ZSV2, the post code area PC2_a, the gap GP (GP14), and the data zone area DZ14 are aligned in order in the traveling direction d2.

When focusing the areas passing through a data zone area DZ15 in the circumferential direction, the data zone areas DZ, the zone servo area ZSV2, the zone servo area ZSV3, the post code area PC2_15, the gap GP (GP15), and the data zone area DZ15 are aligned in order in the traveling direction d2.

When focusing the areas passing through a data zone area DZ19 in the circumferential direction, the data zone areas DZ, the zone servo area ZSV4, the zone servo area ZSV3, the post code area PC3_a, the gap GP (GP19), and the data zone area DZ19 are aligned in order in the traveling direction d2.

When focusing the areas passing through a data zone area DZ21 in the circumferential direction, the data zone areas DZ, the zone servo area ZSV4, the post code area PC4_a, the gap GP (GP21), and the data zone area DZ21 are aligned in order in the traveling direction d2.

When focusing the areas passing through a data zone area DZ24 in the circumferential direction, the data zone areas DZ, the zone servo area ZSV4, the post code area PC4_a, the gap GP (GP24), and the data zone area DZ24 are aligned in order in the traveling direction d2.

When focusing the areas passing through a data zone area DZ25 in the circumferential direction, the data zone areas DZ, the zone servo area ZSV4, the zone servo area ZSV5, the post code area PC4_25, the gap GP (GP25), and the data zone area DZ25 are aligned in order in the traveling direction d2.

As described above, the position of the front end of the data zone area DZ (i.e., the data area start position after passing through the servo area) is shifted by providing the gap GP, to prevent erasure of the post code of the post code area PC adjacent in the radial direction d1 from occurring.

The front end (i.e., the data start position) of the data zone area DZ3 is shifted backward from the rear end of the post code area PC0_a by a circumferential length L3 of the gap GP3, to prevent the post code of the post code area PC0_4 from being erased from the outer circumference OD (data zone area DZ3) side.

The front end of the data zone area DZ4 is shifted backward from the rear end of the post code area PC0_4 by a circumferential length L4 of the gap GP4, to prevent the post code of the post code area PC1_a from being erased from the outer circumference OD (data zone area DZ4) side.

The front end of the data zone area DZ9 is shifted backward from the rear end of the post code area PC1_a by a circumferential length L9 of the gap GP9, to prevent the post code of the post code area PC2_10 from being erased from the outer circumference OD (data zone area DZ9) side.

The front end of the data zone area DZ11 is shifted backward from the rear end of the post code area PC2_a by a circumferential length L11 of the gap GP11, to prevent the post code of the post code area PC2_10 from being erased from the inner circumference ID (data zone area DZ11) side.

The front end of the data zone area DZ14 is shifted backward from the rear end of the post code area PC2_a by a circumferential length L14 of the gap GP14, to prevent the post code of the post code area PC2_15 from being erased from the outer circumference OD (data zone area DZ14) side.

The front end of the data zone area DZ15 is shifted backward from the rear end of the post code area PC2_15 by a circumferential length L15 of the gap GP15, to prevent the post code of the post code area PC3_a from being erased from the outer circumference OD (data zone area DZ15) side.

The front end of the data zone area DZ19 is shifted backward from the rear end of the post code area PC3_a by a circumferential length L19 of the gap GP19, to prevent the post code of the post code area PC4_20 from being erased from the outer circumference OD (data zone area DZ19) side.

The front end of the data zone area DZ21 is shifted backward from the rear end of the post code area PC4_a by a circumferential length L21 of the gap GP21, to prevent the post code of the post code area PC4_20 from being erased from the inner circumference ID (data zone area DZ21) side.

The front end of the data zone area DZ24 is shifted backward from the rear end of the post code area PC4_a by a circumferential length L24 of the gap GP24, to prevent the post code of the post code area PC4_25 from being erased from the outer circumference OD (data zone area DZ24) side.

The front end of the data zone area DZ25 is shifted backward from the rear end of the post code area PC4_25 by a circumferential length L25 of the gap GP25, to prevent the post code of the post code area PC5_a from being erased from the outer circumference OD (data zone area DZ25) side.

In the example shown in FIG. 17, the data zone area DZ3 and the data zone area DZ4 are set as data zones different from each other, but the front ends (data start positions) of the data zone areas DZ3 and DZ4 are substantially the same. For this reason, the data zone area DZ3 and the data zone area DZ4 may be treated as data zones of the same data format.

When focusing the data zone areas DZ3 to DZ5, the front end of the data zone area DZ4 is aligned with the front end of the data zone area DZ5 in the radial direction d1, but may be shifted backward from the front end of the data zone area DZ5. The front end of the data zone area DZ3 may be aligned with at least one of the front end of the data zone area DZ4 and the front end of the data zone area DZ5, in the radial direction d1, but can be shifted forward from the front end of the data zone area DZ4 by a maximum length of L4. The format loss of the data area can be improved by shifting the front end of data zone area DZ3 forward from the front end of the data zone area DZ4.

Similarly, the data zone area DZ10 and the data zone area DZ11 are treated as separate data zones, but the data zone area DZ10 and the data zone area DZ11 may be treated as data zones of the same data format.

The data zone area DZ14 and the data zone area DZ15 are treated as separate data zones, but the data zone area DZ14 and the data zone area DZ15 may be treated as data zones of the same data format.

The data zone area DZ20 and the data zone area DZ21 are treated as separate data zones, but the data zone area DZ20 and the data zone area DZ21 may be treated as data zones of the same data format.

The data zone area DZ24 and the data zone area DZ25 are treated as separate data zones, but the data zone area DZ24 and the data zone area DZ25 may be treated as data zones of the same data format. When focusing the data area DTR located behind the main servo area SVO in the third rotational direction d3, the data area DTR further includes a data zone area DZ1, a data zone area DZ2, a data zone area DZ6, a data zone area DZ7, a data zone area DZ8, a data zone area DZ12, a data zone area DZ13, a data zone area DZ16, a data zone area DZ17, a data zone area DZ18, a data zone area DZ22, a data zone area DZ23, a data zone area DZ26, a data zone area DZ27, and a data zone area DZ28.

FIG. 18 is a schematic diagram showing a part of the area (hereinafter referred to as servo in FIG. 18) of the servo area SV in the radial direction d1, the gap GP, and the data zone area DZ as aligned in the circumferential direction of the disk 10 according to this embodiment, together with an example of a servo gate SG, a write gate WG, and a read gate RG. In addition, FIG. 18 shows an example of a servo gate SG, a write gate WG, and a read gate RG for areas passing through each of the data zone areas DZ3, DZ4, DZ9, DZ11, DZ14, DZ15, DZ19, DZ21, DZ24, and DZ25 in the circumferential direction. In the figure, the data zone area DZ is not arranged in the area marked with left ascending diagonal lines, in the gap GP. If the data zone area DZ is arranged in the area marked with left ascending diagonal lines, erasure of the post code in the post code area adjacent to the area marked with left ascending diagonal lines in the radial direction d1 may occur.

As shown in FIG. 18, timing T72 is set to shift the front end of the data zone area DZ (i.e., the data start position) backward from the rear end of the servo by a gap GP. When the timing when the servo ends, for example, timing T71 when the servo gate SG is negated, is used as a reference, the timing T72 is the timing when a predetermined delay period has elapsed from the timing T71 and is the timing when the write gate WG is asserted.

Timing T73 is set to read the user data in the displaced write data zone area DZ. When the timing T71 is used as a reference, timing T73 is the timing when a predetermined delay period has elapsed from the timing T71 and is the timing when the read gate RG is asserted.

For example, the write gate WG is asserted at the timing T72 when a delay period WGdly2 has elapsed from the timing T71 when the servo gate SG is negated. The user data can be thereby written to the data zone area DZ without erasing the post code in the post code area adjacent to the gap GP in the radial direction d1. In addition, the read gate RG is asserted at the timing T73 when a delay period RGdly2 has elapsed from the timing T71. The user data in the displaced write data zone area DZ can be thereby read.

Next, the format loss in the double zone servo area ZB will be described. In the servo sector SVS in the double zone servo area ZB, a first servo having a servo length S1, a gap having a gap length G1, and a second servo having a servo length S2 are aligned in the rotational direction d3 of the disk. The number of servo sectors SVS in one track is denoted by N, and the length occupied by a servo in one track is denoted by A. The length A is expressed by the following expression.

$$A = N \times (S1 + G1 + S2)$$

In addition, the length of one track is denoted by LE, and the length that can be used as the data area DTR in one track is denoted by DI. The length DI is expressed by the following expression.

$$DI = LE - A = LE - N \times (S1 + G1 + S2)$$

When a gap between the zone servo area ZSV on the front side and the zone servo area ZSV on the rear side in the double zone servo area ZB becomes zero, similarly to this embodiment, the length DI becomes the maximum value. In other words, when the gap length G1 becomes zero, the length DI that can be used as the data area DTR in one track can be maximized.

Figure 19:
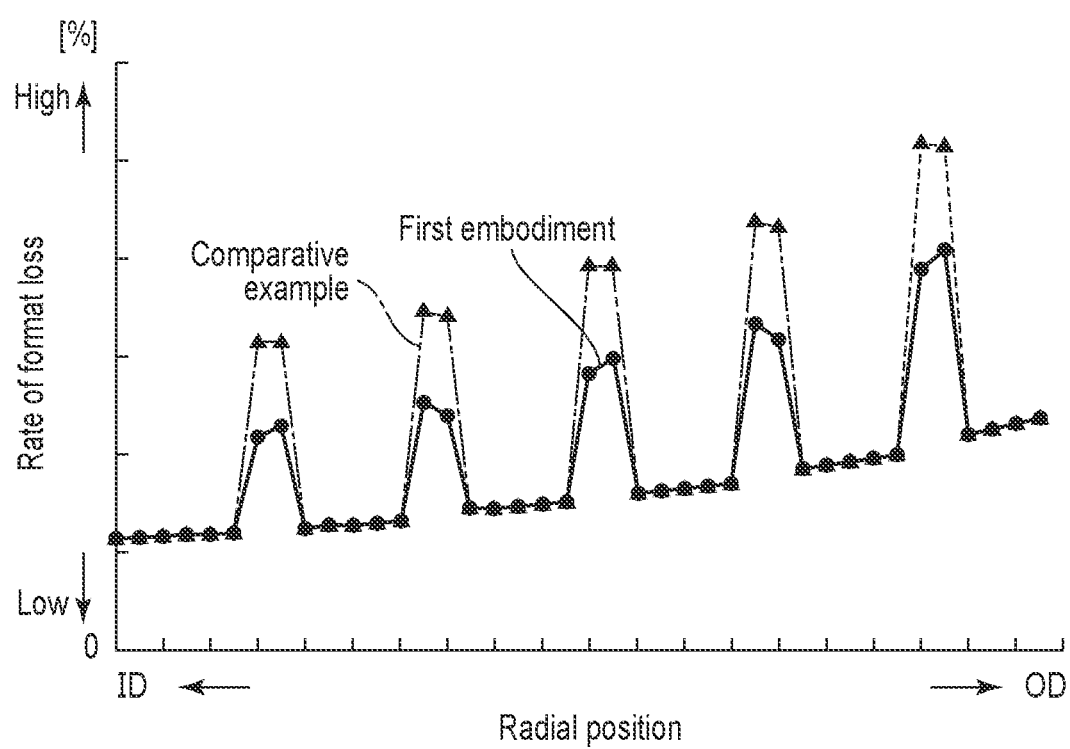
FIG. 19 is a graph showing a change in a ratio of a format loss to the radial position of the disk in each of the first embodiment and the comparative example.

Next, an example of reducing the gap between the zone servo area ZSV on the front side and the zone servo area ZSV on the rear side, making the gap zero, and improving the rate of the format loss, in the double zone servo area ZB, will be described. FIG. 19 is a graph showing a change in the rate of the format loss to the radial position of the disk 10 in each of this embodiment and the comparative example.

As shown in FIG. 19, the gap exists between the zone servo area ZSV on the front side and the zone servo area ZSV on the rear side in the comparative example, but the gap between the zone servo area ZSV on the front side and the zone servo area ZSV on the rear side is eliminated in this embodiment. In this embodiment, for example, the recording capacity of the magnetic disk device 1 can be increased since the format loss is improved.

Next, a method of writing the post code in each of the areas in the radial direction d1 will be described.

When focusing the area passing through the single zone servo area ZG in the circumferential direction, the post code may be written at timing when a period corresponding to the read/write gap Grw has elapsed from the rear end of the zone servo area ZSV (for example, the burst area of the zone servo area ZSV).

For example, in FIG. 16, when the detection position (end position) of the servo mark 3 is set as a reference, the timing of writing the post code 3 is the timing when a sum of the circumferential length of the gray code 3, the circumferential length of the burst data 3, and the read/write gap Grw in the circumferential direction has elapsed from the detection position of the servo mark 3.

When focusing the area passing through the area where the zone servo sector ZSVS on the rear side is read, of the area passing through the double zone servo area ZB, in the circumferential direction, the post code may be written at timing when a period corresponding to the read/write gap Grw has elapsed from the rear end of the zone servo sector ZSVS on the rear side (for example, the burst area of the zone servo sector ZSVS on the rear side).

For example, in FIG. 15, when the detection position (end position) of the servo mark 2 of the zone servo sector ZSVS on the rear side is set as a reference, the timing of writing the post code 2 is the timing when a sum of the circumferential length of the gray code 2, the circumferential length of the burst data 2, and the read/write gap Grw in the circumferential direction has elapsed from the detection position of the servo mark 2.

When focusing the area passing through the area where the zone servo sector ZSVS on the front side is read, of the area passing through the double zone servo area ZB, in the circumferential direction, the post code may not be written at timing when a period corresponding to the read/write gap Grw has elapsed from the rear end of the zone servo sector ZSVS on the front side (for example, the burst area of the zone servo sector ZSVS on the front side), but the post code may be written at timing when a period corresponding to the read/write gap Grw has elapsed from the rear end of the zone servo sector ZSVS on the rear side (for example, the burst area of the zone servo sector ZSVS on the rear side).

For example, in FIG. 14, when the detection position (end position) of the servo mark 1 of the zone servo sector ZSVS on the front side is set as a reference, the timing of writing the post code 1 is the timing when a sum of the circumferential length of the gray code 1, the circumferential length of the burst data 1, the circumferential length of the additional pattern 1, the circumferential length of the preamble 2, the circumferential length of the servo mark 2, the circumferential length of the gray code 2, the circumferential length of the burst data 2, and the read/write gap Grw in the circumferential direction has elapsed from the detection position of the servo mark 1.

When the detection position (end position) of the servo mark of the servo to be read (i.e., the servo of the zone servo sector ZSVS) is set as the reference and when the zone servo sector ZSVS of the single zone servo area ZG is read or the zone servo sector ZSVS on the rear side of the double zone servo area ZB is read, timing WtTiming1 of writing the post code is as follows. The timing WtTiming1 may be set as the timing when a sum of the circumferential length of the gray code of the servo to be read, the circumferential length of the burst data of the servo to be read, and the read/write gap Grw in the circumferential direction has elapsed from the detection position of the servo mark.

When the detection position (end position) of the servo mark of the servo to be read (i.e., the servo of zone servo sector ZSVS) is set as a reference and when the zone servo sector ZSVS on the front side of the double zone servo area ZB is read, timing WtTiming2 of writing the post code is as follows. The timing WtTiming2 may be the timing when a sum of the circumferential length of the gray code of the servo to be read, the circumferential length of the burst data of the servo to be read, the circumferential length of the additional pattern of the servo to be read, the circumferential length of the preamble of the servo not to be read (that cannot be accurately demodulated), the circumferential length of the servo mark not to be read, the circumferential length of the gray code not to be read, the circumferential length of the burst data not to be read, and the read/write gap Grw in the circumferential direction has elapsed from the detection position of the servo mark.

Next, the timing of reading the post code in each of the areas in the radial direction d1 will be described.

When focusing the area passing through the single zone servo area ZG in the circumferential direction, the RRO gate may be asserted from the rear end of the zone servo sector ZSVS (for example, the burst area of the zone servo sector ZSVS) to read the post code.

For example, in FIG. 16, when the detection position (end position) of the servo mark 3 is set as a reference, the timing of reading the post code 3 (i.e., the timing of asserting the RRO gate) is the timing when a sum of the circumferential length of the gray code 3 and the circumferential length of the burst data 3 has elapsed from the detection position of the servo mark 3.

When focusing the area passing through the area where the zone servo sector ZSVS on the rear side is read, of the area passing through the double zone servo area ZB, in the circumferential direction, the RRO gate may be asserted from the rear end of the zone servo sector ZSVS on the rear side (for example, the burst area of the zone servo sector ZSVS on the rear side) to read the post code.

For example, in FIG. 15, when the detection position (end position) of the servo mark 2 of the zone servo sector ZSVS on the rear side is set as a reference, the timing of reading the post code 2 (i.e., the timing of asserting the RRO gate) is the timing when a sum of the circumferential length of the gray code 2 and the circumferential length of the burst data 2 has elapsed from the detection position of the servo mark 2.

When focusing the area passing through the area where the zone servo sector ZSVS on the front side is read, of the area passing through the double zone servo area ZB, in the circumferential direction, the post code may not be read from the rear end of the zone servo sector ZSVS on the front side (for example, the burst area of the zone servo sector ZSVS on the front side), but the RRO gate may be asserted from the rear end of the zone servo sector ZSVS on the rear side (for example, the burst area of the zone servo sector ZSVS on the rear side) to read the post code.

For example, in FIG. 14, when the detection position (end position) of the servo mark 1 of the zone servo sector ZSVS on the front side is set as a reference, the timing of reading the post code 1 (i.e., the timing of asserting the RRO gate) is the timing when a sum of the circumferential length of the gray code 1, the circumferential length of the burst data 1, the circumferential length of the additional pattern 1, the circumferential length of the preamble 2, the circumferential length of the servo mark 2, the circumferential length of the gray code 2, and the circumferential length of the burst data 2 has elapsed from the detection position of the servo mark 1.

When the detection position (end position) of the servo mark of the servo to be read (i.e., the servo of the zone servo sector ZSVS) is set as the reference and when the zone servo sector ZSVS of the single zone servo area ZG is read or the zone servo sector ZSVS on the rear side of the double zone servo area ZB is read, timing RdTiming1 of reading the post code is as follows. The timing RdTiming1 may be set as the timing when a sum of the circumferential length of the gray code of the servo to be read, and the circumferential length of the burst data of the servo to be read has elapsed from the detection position of the servo mark.

When the detection position (end position) of the servo mark of the servo to be read (i.e., the servo of zone servo sector ZSVS) is set as a reference and when the zone servo sector ZSVS on the front side of the double zone servo area ZB is read, timing RdTiming2 of reading the post code is as follows. The timing RdTiming2 may be the timing when a sum of the circumferential length of the gray code of the servo to be read, the circumferential length of the burst data of the servo to be read, the circumferential length of the additional pattern of the servo to be read, the circumferential length of the preamble of the servo not to be read, the circumferential length of the servo mark not to be read, the circumferential length of the gray code not to be read, and the circumferential length of the burst data not to be read, has elapsed from the detection position of the servo mark.

Figure 20:
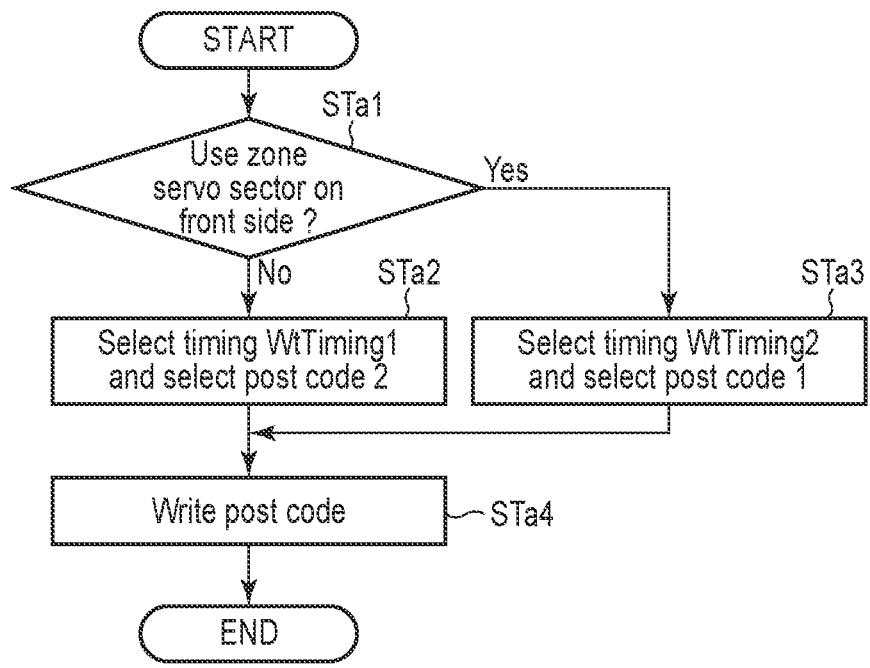
FIG. 20 is a flowchart showing an example of a write processing method of a post code according to the first embodiment.

FIG. 20 is a flowchart showing an example of a write processing method of the post code according to this embodiment.

As shown in FIG. 8 and FIG. 20, when the post code write process is started, the system controller 130 first determines whether or not the zone servo sector ZSVS on the front side is to be used when writing the post code, in step STa1.

As shown in FIG. 8, FIG. 15, and FIG. 20, when the system controller 130 determines that the zone servo sector ZSVS on the front side is not to be used (step STa1), the flow shifts to step STa2 and the system controller 130 selects the timing WtTiming1 and selects the post code 2 in step STa2. After that, the flow shifts to step STa4 and the system controller 130 writes the selected post code (post code 2) to a predetermined area of the disk 10 in step STa4, and ends the post code write process.

In contrast, as shown in FIG. 8, FIG. 14, and FIG. 20, when the system controller 130 determines that the zone servo sector ZSVS on the front side is to be used (step STa1), the flow shifts to step STa3 and the system controller 130 selects the timing WtTiming2 and selects the post code 1 in step STa3. After that, the flow shifts to step STa4 and the system controller 130 writes the selected post code (post code 1) to a predetermined area of the disk 10 in step STa4, and ends the post code write process.

Figure 21:
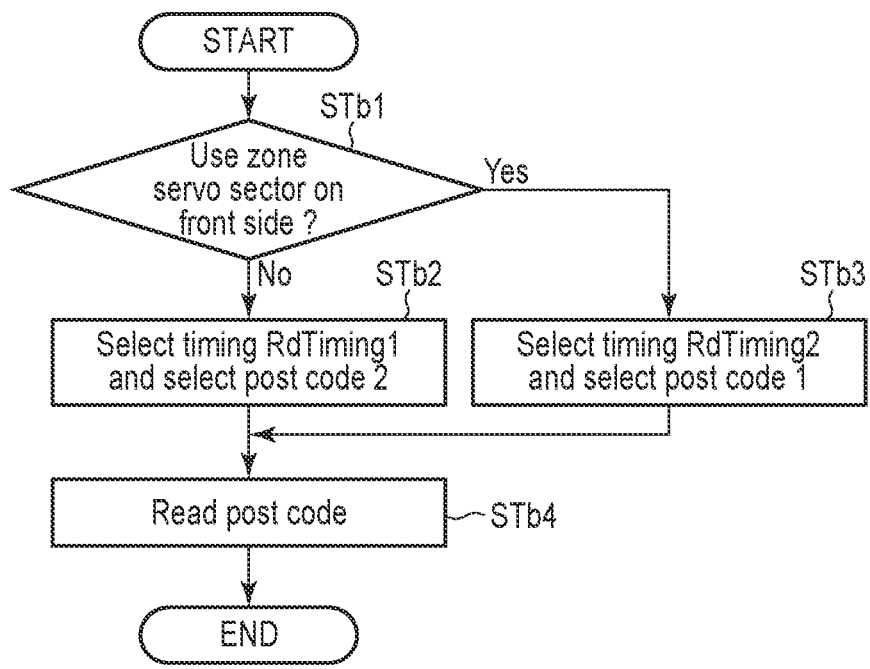
FIG. 21 is a flowchart showing an example of a method of reading the post code according to the first embodiment.

FIG. 21 is a flowchart showing an example of a read processing method of the post code according to this embodiment.

As shown in FIG. 8 and FIG. 21, when the post code read process is started, the system controller 130 first determines whether or not the zone servo sector ZSVS on the front side is to be used when reading the post code, in step STb1.

As shown in FIG. 8, FIG. 15, and FIG. 21, when the system controller 130 determines that the zone servo sector ZSVS on the front side is not to be used (step STb1), the flow shifts to step STb2 and the system controller 130 selects the timing RdTiming1 and selects the post code 2 in step STb2. After that, the flow shifts to step STb4 and the system controller 130 reads the selected post code (post code 2) in step STb4, and ends the post code read process.

In contrast, as shown in FIG. 8, FIG. 14, and FIG. 21, when the system controller 130 determines that the zone servo sector ZSVS on the front side is to be used (step STb1), the flow shifts to step STb3 and the system controller 130 selects the timing RdTiming2 and selects the post code 1 in step STb3. After that, the flow shifts to step STb4 and the system controller 130 reads the selected post code (post code 1) in step STb4, and ends the post code read process.

Figure 22:
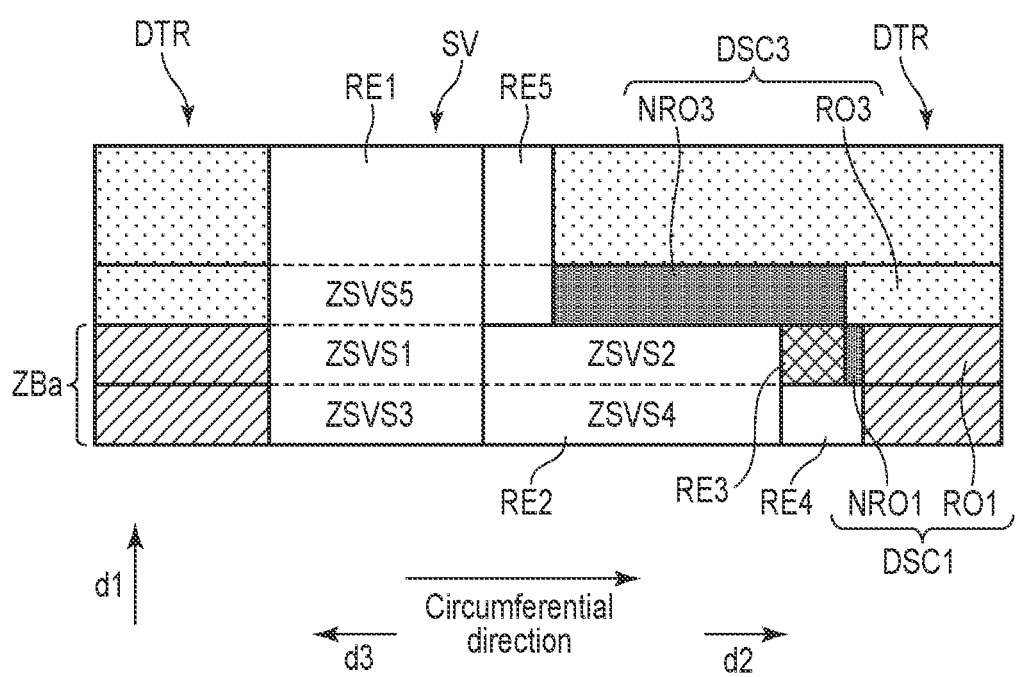
FIG. 22 is a schematic diagram partially showing the areas in the circumferential direction of the disk according to the first embodiment, illustrating one servo area and two data areas.

Next, the configuration and advantages of the magnetic disk device 1 of this embodiment will be described with reference to FIG. 1 and FIG. 22. FIG. 22 is a schematic diagram showing several areas in the circumferential direction of the disk 1 according to this embodiment, illustrating one servo area SV and two data areas DTR. In the figure, the non-target area NRO is marked with dot patterns more densely than a second target area RO2.

As shown in FIG. 1 and FIG. 22, according to the magnetic disk device 1 of the first embodiment configured as described above, the magnetic disk device 1 comprises the disk 10, the head 15, and the controller 130.

(1) The disk 10 includes a double zone servo area (zone servo boundary area) ZBa including a first area (first zone servo area) RE1 of a first servo frequency, a second area (second zone servo area) RE2 of a second servo frequency, and a third area (first corrected data storage area) RE3 of the first servo frequency, in the servo area SV. The head 15 includes the write head 15W which writes data to the disk 10 and the read head 15R which reads data from the disk 10. The controller 130 demodulates the first servo data of the first area RE1 read by the head 15 to derive the position of the head 15, and demodulates the first corrected data of the third area RE3 read by the head 15 to correct the position of the head 15, to position the head 15 in association with a predetermined track.

The first area RE1, second area RE2, and third area RE3 are aligned in order in the traveling direction d2 of the head 15 relative to the disk 10. The first area RE1 and the second area RE2 are adjacent to each other in the circumferential direction of the disk 10. The second area RE2 and the third area RE3 are adjacent to each other in the circumferential direction of the disk 10. No gap exists between the first area RE1 and the second area RE2. For this reason, the servo occupancy ratio can be lowered and the data formatting efficiency can be increased in the magnetic disk device 1 according to the first embodiment.

For example, the first area RE1 is the zone servo area ZSV on the front side, the second area RE2 is the zone servo area ZSV on the rear side, and the third area RE3 includes the first post code area. The first zone servo sector ZSVS1 of the first area RE1 includes the first preamble area, the first servo mark area, the first gray code area, and the first burst area aligned in order in the traveling direction d2 (FIG. 14). The second zone servo sector ZSVS2 of the second area RE2 includes the second preamble area, the second servo mark area, the second gray code area, and the second burst area aligned in order in the traveling direction d2 (FIG. 14). The first servo frequency is the same as the frequency of the first preamble area. The second servo frequency is the same as the frequency of the second preamble area.

(2) In addition, the double zone servo area (zone servo boundary area) ZBa further includes a fourth area (second corrected data storage area) RE4 of the second servo frequency. The controller 130 demodulates the second servo data of the second area RE2 read by the head 15 to derive the position of the head 15, and demodulates the second corrected data of the fourth area RE4 read by the head 15 to correct the position of the head 15, to position the head 15 in association with a predetermined track. The first area RE1, the second area RE2, and the fourth area RE4 are aligned in order in the traveling direction d2. The second area RE2 and the fourth area RE4 are adjacent to each other in the circumferential direction of the disk 10.

The third area RE3 and the fourth area RE4 are adjacent to each other in the radial direction d1 of the disk 10. In other words, the third area RE3 is arranged to be adjacent to the fourth area RE4 in the radial direction d1, and the gaps between the first area RE1 and the second area RE2 can be thereby reduced.

For example, the first area RE1 is the zone servo area ZSV on the front side, the second area RE2 is the zone servo area ZSV on the rear side, the third area RE3 includes the first post code area, and the fourth area RE4 includes the second post code area. The third zone servo sector ZSVS3 of the first area RE1 includes the first preamble area, the first servo mark area, the first gray code area, and the first burst area aligned in order in the traveling direction d2 (FIG. 14). The fourth zone servo sector ZSVS4 of the second area RE2 includes the second preamble area, the second servo mark area, the second gray code area, and the second burst area aligned in order in the traveling direction d2 (FIG. 14). The first servo frequency is the same as the frequency of the first preamble area. The second servo frequency is the same as the frequency of the second preamble area.

(3) The disk 10 further includes the user data area (data area) DTR adjacent to the servo area SV in the traveling direction d2. The first data sector DSC1 of the user data area DTR includes a first non-target area NRO1 and a first target area RO1 aligned in order in the traveling direction d2. The first non-target area NRO1 is located between the third area RE3 (second zone servo sector ZSVS2) and the first target area RO1 in the traveling direction d2, and is adjacent to each of the third area RE3 and the first target area RO1.

The controller 130 uses the first target area RO1 as the target for reading and writing, and excludes the first non-target area NRO1 from the target for reading and writing. For example, the first non-target area NRO1 is a gap GP (FIG. 18). A situation that the second post code of the fourth area RE4 may be erased when writing the user data to the first target area RO1 can be avoided by providing the first non-target area NRO1 in the first data sector DSC1.

The third area RE3 is adjacent to the outer circumferential side of the fourth area RE4. When looking at the disk 10 with respect to the rotational direction d3, the front end of the first target area RO1 is aligned with the rear end of the fourth area RE4 in the radial direction d1. A situation that the second post code of the fourth area RE4 may be erased can be thereby avoided certainly.

Unlike the example in FIG. 22, the front end of the first target area RO1 may be located behind the rear end of the fourth area RE4. In other words, the front end of the first target area RO1 may be located in front of the rear end of the fourth area RE4 in the traveling direction d2. In this case, too, a situation that the second post code of the fourth area RE4 may be erased can be avoided certainly.

(4) In addition, the servo area SV further includes a fifth area (third corrected data storage area) RE5 of the first servo frequency. The controller 130 demodulates the first servo data of the first area RE1 read by the head 15 to derive the position of the head 15, and demodulates the third corrected data of the fifth area RE5 read by the head 15 to correct the position of the head 15, to position the head 15 in association with a predetermined track. The first area RE1 and the fifth area RE5 are aligned in order in the traveling direction d2. The first area RE1 and the fifth area RE5 are adjacent to each other in the circumferential direction of the disk 10. The second area RE2 and the fifth area RE5 are adjacent to each other in the radial direction d1.

For example, the first area RE1 is the area located in the single zone servo area ZG of the zone servo area ZSV on the front side, and the fifth area RE5 includes the third post code area. The fifth zone servo sector ZSVS5 of the first area RE1 includes the first preamble area, the first servo mark area, the first gray code area, and the first burst area aligned in order in the traveling direction d2 (FIG. 14).

(5) The third data sector DSC3 of the user data area DTR includes a third non-target area NRO3 and a third target area RO3 aligned in order in the traveling direction d2. The third non-target area NRO3 is located between the fifth area RE5 (fifth zone servo sector ZSVS5) and the third target area RO3 in the traveling direction d2, and is adjacent to each of the fifth area RE5 and the third target area RO3.

The controller 130 uses the third target area RO3 as the target for reading and writing, and excludes the third non-target area NRO3 from the target for reading and writing. For example, the third non-target area NRO3 is the gap GP (FIG. 18). A situation that the first post code of the third area RE3 may be erased when writing the user data to the third target area RO3 can be avoided by providing the third non-target area NRO3 in the third data sector DSC3.

When looking at the disk 10 with respect to the rotational direction d3, the front end of the third target area RO3 is aligned with the rear end of the third area RE3 in the radial direction d1. A situation that the first post code of the third area RE3 may be erased can be thereby avoided certainly.

Unlike the example in FIG. 22, the front end of the third target area RO3 may be located behind the rear end of the third area RE3. In other words, the front end of the third target area RO3 may be located in front of the rear end of the third area RE3 in the traveling direction d2. In this case, too, a situation that the first post code of the third area RE3 may be erased can be avoided certainly.

Next, the configuration and advantages of the magnetic disk device 1 of this embodiment will be explained with reference to FIG. 1 and FIG. 17. The double zone servo area (zone servo boundary area) ZB2 will be focused. The zone servo area ZSV2 corresponds to the first area, the zone servo area ZSV1 corresponds to the second area, the post code area PC2_10 corresponds to the third area, and the post code area PC1_$a$ corresponds to the fourth area.

As shown in FIG. 1 and FIG. 17, the data zone area DZ9 of the user data area DTR includes the second non-target area NRO2 (gap GP9) and the second target area RO2 aligned in order in the traveling direction d2. The second non-target area NRO2 is located between the post code area PC1_$a$ (fourth area) and the second target area RO2 in the traveling direction d2, and is adjacent to each of the post code area PC1_$a$ and the second target area RO2.

The controller 130 uses the second target area RO2 as the target for reading and writing, and excludes the second non-target area NRO2 from the target for reading and writing. A situation that the post code of the post code area PC2_10 may be erased when writing the user data to the second target area RO2 can be avoided by providing the second non-target area NRO2 (gap GP9).

The post code area PC2_10 (third area) is adjacent to the inner circumferential side of post code area PC1_a (fourth area). When looking at the disk 10 with respect to the rotational direction d3, the front end of the second target area RO2 is aligned with the rear end of the post code area PC2_10 in the radial direction d1. A situation that the post code of the post code area PC2_10 may be erased can be thereby avoided certainly.

Unlike the example in FIG. 17, the front end of the second target area RO2 may be located behind the rear end of the post code area PC2_10. In other words, the front side of the second target area RO2 may be located in front of the rear end of the post code area PC2_10 in the traveling direction d2. In this case, too, a situation that the post code of the post code area PC2_10 may be erased can be thereby avoided certainly.

Second Embodiment

Figure 23:
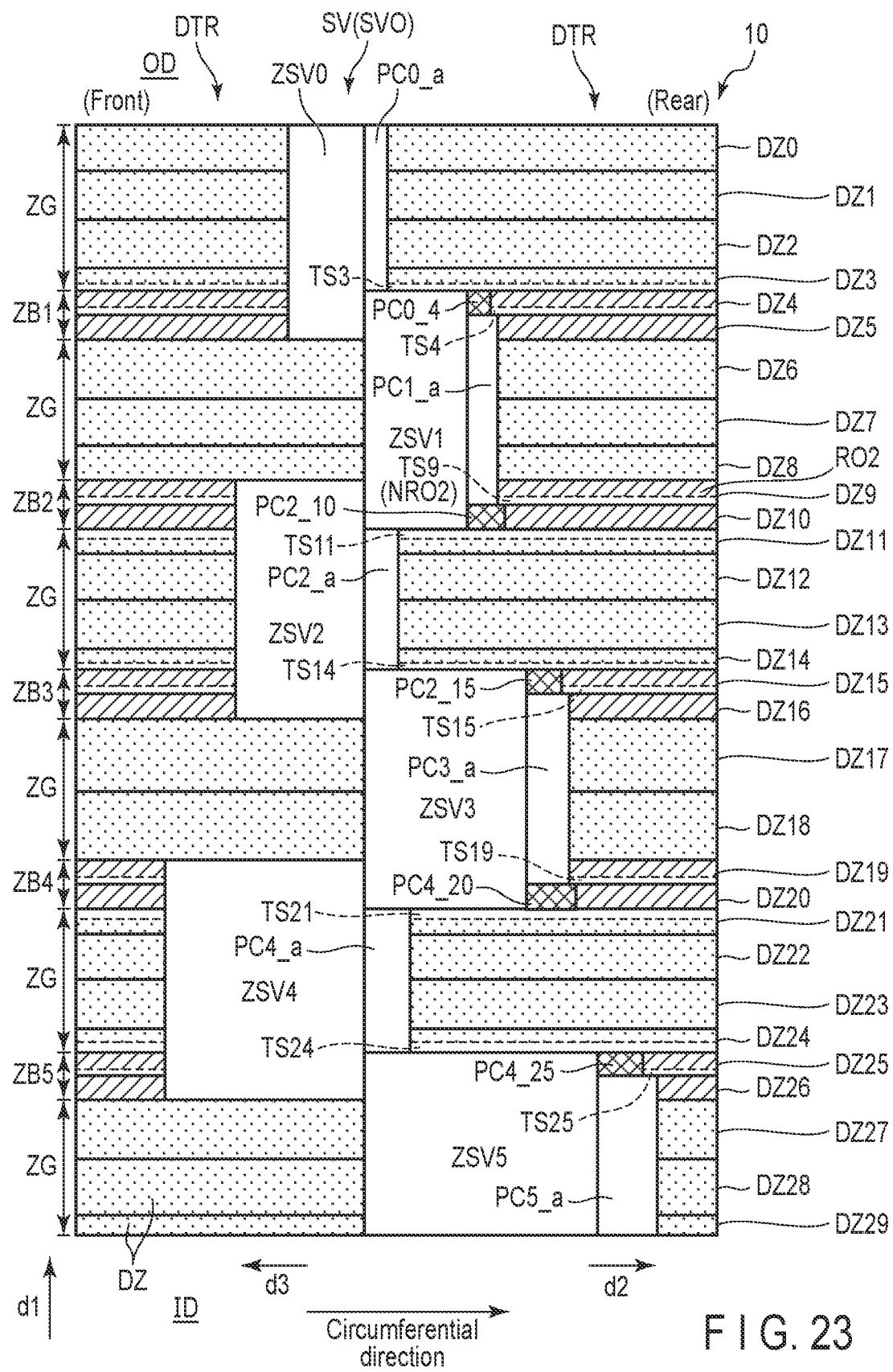
FIG. 23 is a schematic diagram partially showing areas in a circumferential direction of a disk of a magnetic disk device according to a second embodiment, illustrating one main servo area and two data areas.

Next, a second embodiment will be described. A magnetic disk device 1 is configured in the same manner as the above-described first embodiment except for constituent elements to be described in this embodiment. FIG. 23 is a schematic diagram showing several areas in the circumferential direction of the disk 10 of the magnetic disk device 1 according to this embodiment, illustrating one main servo area SVO and two data areas DTR. In the figure, a plurality of data zone areas DZ adjacent to the single zone servo area ZG are marked with dot patterns, in the circumferential direction, and the plurality of data zone areas DZ adjacent to the double zone servo area ZB are marked with right ascending diagonal lines. However, track skip areas TS of the data zone areas DZ are painted white (blank).

As shown in FIG. 23, this embodiment is different from the first embodiment (FIG. 17) in that the data area DTR does not include the gap GP (non-target area NRO) adjacent to the servo area SV. In other words, this embodiment does not adopt a data format for shifting backward a front end of the data zone area DZ (data sector DSC) in the rotational direction d3, to avoid a situation that the post code of the post code area adjacent to the double zone servo area ZB in the circumferential direction may be erased. In this embodiment, an area of the data zone area DZ that is adjacent to the post code area in the radial direction d1 is referred to as a track skip area TS. A situation that the post code of the post code area adjacent to the track skip area TS in the radial direction d1 may be erased can be avoided by providing the track skip area TS where the user data is not written into the data zone area DZ. The data zone area DZ includes a track skip area TS3, a track skip area TS4, a track skip area TS9, a track skip area TS11, a track skip area TS14, a track skip area TS15, a track skip area TS19, a track skip area TS21, a track skip area TS24, and a track skip area TS25.

For example, a range adjacent to the data sector DSC where data is written, in the radial direction d1 is referred to as a data track range (track range). The data track range is the range where undesired erasure occurs when user data is written to the data sector DSC. The data track range is referred to as wATE [track].

In the data zone areas DZ3, DZ4, DZ9, DZ14, DZ15, DZ19, DZ24, and DZ25 where undesired erasure may occur on the inner circumference ID side, the track skip area TS may be provided in the inner circumference ID side, and an area from "a track obtained by the innermost circumferential track of the data zone area DZ−wATE+1 track" to "the innermost circumferential track in the data zone area DZ" in each of the data zone areas DZ may be referred to as at least a track skip.

In contrast, in the data zone areas DZ11 and DZ21 where undesired erasure may occur on the outer circumference OD side, the track skip area TS may be provided on the outer side, and an area from "the outermost circumferential track in the data zone area DZ" to "a track obtained by the outermost circumferential track in the data zone area DZ+wATE−1 track" in each of the data zone areas DZ may be referred to as at least a track skip. Counting one track on the inner circumference ID side is referred to as +1 track, and counting one track on the outer circumference OD side is referred to as −1 track.

As described above, when the track skip area TS is provided in the data area DTR, the gap GP shown in FIG. 17 of the first embodiment (i.e., the non-target area NRO in FIG. 22) does not need to be provided in the data area DTR. However, the upper limit of the number of tracks in the track skip area TS needs to be considered, and the upper limit needs to be restricted to a range where an areal density capability (ADC) gain can be obtained by reducing the gaps GP in FIG. 17. When focusing the data area DTR located behind the main servo area SVO in the third rotational direction d3, the data area DTR further includes a data zone area DZ0, a data zone area DZ1, a data zone area DZ2, a data zone area DZ5, a data zone area DZ6, a data zone area DZ7, a data zone area DZ8, a data zone area DZ10, a data zone area DZ12, a data zone area DZ13, a data zone area DZ16, a data zone area DZ17, a data zone area DZ18, a data zone area DZ20, a data zone area DZ22, a data zone area DZ23, a data zone area DZ26, a data zone area DZ27, a data zone area DZ28, and a data zone area DZ29.

Next, the configuration and advantages of the magnetic disk device 1 of this embodiment will be described with reference to FIG. 1 and FIG. 24. FIG. 24 is a schematic diagram showing several areas in the circumferential direction of the disk 1 according to this embodiment, illustrating one servo area SV and two data areas DTR. FIG. 24 is a schematic diagram showing several areas in the circumferential direction of the disk 1 according to this embodiment, illustrating one servo area SV and two data areas DTR. In the figure, the non-target area NRO is painted white (blank).

As shown in FIG. 1 and FIG. 24, according to the magnetic disk device 1 of the second embodiment configured as described above, the magnetic disk device 1 comprises a disk 10, a head 15, and a controller 130. No gap exists between a first area RE1 and a second area RE2 in this embodiment, either. For this reason, the same advantages of the above-described first embodiment can be obtained from this embodiment.

The data zone area DZ, a first zone area ZSVR1 of a first area RE1 (zone servo area ZSV), a second zone area ZSVR2 of a second area RE2 (zone servo area ZSV), a third area RE3, and a first data zone area DZa are aligned in order in the traveling direction d2. The data zone area DZ, a third zone area ZSVR3 of the first area RE1 (zone servo area ZSV), a fourth zone area ZSVR4 of the second area RE2 (zone servo area ZSV), a fourth area RE4, and a data zone area DZ are aligned in order in the traveling direction d2. The data zone area DZ, a fifth zone area ZSVR5 of the first area RE1 (zone servo area ZSV), a fifth area RE5, and a second data zone area DZb are aligned in order in the traveling direction d2.

(1) The disk 10 includes the user data area (data area) DTR adjacent to the servo area SV in the traveling direction d2. The first data zone area DZa of the user data area DTR includes a first non-target area NRO1 and a first target area RO1, which are each adjacent to the third area (first corrected data storage area) RE3 in the traveling direction d2 and which are aligned in the radial direction d1. The first non-target area NRO1 is located between the fourth area (second corrected data storage area) RE4 and the first target area RO1 in the radial direction d1 and is adjacent to each of the fourth area RE4 and the first target area RO1.

The controller 130 uses the first target area RO1 as the target for reading and writing, and excludes the first non-target area NRO1 from the target for reading and writing. For example, the first non-target area NRO1 is the track skip area TS (FIG. 23) and the first target area RO1 is a non-track skip area. A situation that the second post code of the fourth area RE4 may be erased when writing the user data to the first target area RO1 can be avoided by providing the first non-target area NRO1 in the first data zone area DZa.

The first non-target area NRO1 is the area which is influenced when the user data (data) is written to the first target area RO1.

(2) In addition, the servo area SV includes a fifth area (third corrected data storage area) RE5 of the first servo frequency. The controller 130 demodulates the first data of the first area RE1 read by the head 15 to derive the position of the head 15, and demodulates the fifth data of the fifth area RE5 read by the head 15 to correct the position of the head 15, to position the head 15 in association with a predetermined track.

The first area RE1 and the fifth area RE5 are aligned in order in the traveling direction d2. The first area RE1 and the fifth area RE5 are adjacent to each other in the circumferential direction of the disk 10. The second area RE2 and the fifth area RE5 are adjacent to each other in the radial direction d1.

For example, the first area RE1 is the area located in the single zone servo area ZG of the zone servo area ZSV on the front side, and the fifth area RE5 includes the first post code area. The fifth zone area ZSVR5 of the first area RE1 includes the first preamble area, the first servo mark area, the first gray code area, and the first burst area aligned in order in the traveling direction d2 (FIG. 14). Each of the first zone area ZSVR1 to the fourth zone area ZSVR4 also includes the preamble area, the servo mark area, the gray code area, and the burst area aligned in order in the traveling direction d2.

(3) The third data zone area DZc of the user data area DTR includes a third non-target area NRO3 and a third target area RO3, which are each adjacent to the fifth area RE5 in the traveling direction d2 and which are aligned in the radial direction d1. The third non-target area NRO3 is located between the second and third areas RE2 and RE3 and the third target area RO3 in the radial direction d1, and is adjacent to each of the second area RE2 (second zone area ZSVR2), the third area RE3, and the third target area RO3.

The controller 130 uses the third target area RO3 as the target for reading and writing, and excludes the third non-target area NRO3 from the target for reading and writing. For example, the third non-target area NRO3 is the track skip area TS (FIG. 23) and the third target area RO3 is a non-track skip area. A situation that the first post code of the third area RE3 may be erased when writing the user data to the third target area RO3 can be avoided by providing the third non-target area NRO3 in the third data zone area DZc. In addition, a situation that the servo data of the second zone area ZSVR2 may be erased can be avoided.

The third non-target area NRO3 is the area which is influenced when the user data (data) is written to the third target area RO3.

Next, the configuration and advantages of the magnetic disk device 1 of this embodiment will be described with reference to FIG. 1 and FIG. 23. The double zone servo area (zone servo boundary area) ZB2 will be focused. The zone servo area ZSV2 corresponds to the first area, the zone servo area ZSV1 corresponds to the second area, the post code area PC2_10 corresponds to the third area, and the post code area PC1_a corresponds to the fourth area.

As shown in FIG. 1 and FIG. 23, the data zone area DZ9 of the user data area DTR includes a second non-target area NRO2 and a second target area RO2, which are each adjacent to the post code area PC1_a in the traveling direction d2 and which are aligned in the radial direction d1. For example, the second non-target area NRO2 is the track skip area TS, and the second target area RO2 is a non-track skip area. The second non-target area NRO2 is located between the post code area PC2_10 and the second target area RO2 in the radial direction d1, and is adjacent to each of the post code area PC2_10 and the second target area RO2.

The controller 130 uses the second target area RO2 as the target for reading and writing, and excludes the second non-target area NRO2 from the target for reading and writing. A situation that the post code of the post code area PC2_10 may be erased when writing the user data to the second target area RO2 can be avoided by providing the second non-target area NRO2.

The second non-target area NRO2 is the area which is influenced when the user data (data) is written to the second target area RO2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk including a zone servo boundary area including a first area of a first servo frequency, a second area of a second servo frequency, and a third area of the first servo frequency, in a servo area;
   a head including a write head for writing data to the disk and a read head for reading data from the disk; and
   a controller demodulating first servo data of the first area read by the head to derive a position of the head, and demodulating first corrected data of the third area read by the head to correct the position of the head, to position the head in association with a predetermined track,
   the first area, the second area, and the third area being aligned in order in a traveling direction of the head for the disk,
   the first area and the second area being adjacent to each other in a circumferential direction of the disk,
   the second area and the third area being adjacent to each other in the circumferential direction of the disk.

2. The magnetic disk device of claim 1, wherein
   the first area includes a first preamble area, a first servo mark area, a first gray code area, and a first burst area aligned in order in the traveling direction of the head, the second area includes a second preamble area, a second servo mark area, a second gray code area, and a second burst area aligned in order in the traveling direction of the head, the third area includes a first post code area, the first servo frequency is similar to a frequency of the first preamble area, and the second servo frequency is similar to a frequency of the second preamble area.

3. The magnetic disk device of claim 1, wherein the zone servo boundary area further includes a fourth area of the second servo frequency, the controller demodulates second servo data of the second area read by the head to derive a position of the head, and demodulates second corrected data of the fourth area read by the head to correct the position of the head, to position the head in association with a predetermined track, the first area, the second area, and the fourth area are aligned in order in a traveling direction of the head for the disk, the second area and the fourth area are adjacent to each other in the circumferential direction of the disk, and the third area and the fourth area are adjacent to each other in a radial direction of the disk.

4. The magnetic disk device of claim 3, wherein the first area includes a first preamble area, a first servo mark area, a first gray code area, and a first burst area aligned in order in the traveling direction of the head, the second area includes a second preamble area, a second servo mark area, a second gray code area, and a second burst area aligned in order in the traveling direction of the head, the third area includes a first post code area, the fourth area includes a second post code area, and the first servo frequency is similar to a frequency of the first preamble area, and the second servo frequency is similar to a frequency of the second preamble area.

5. The magnetic disk device of claim 3, wherein the disk further includes a user data area adjacent to the servo area in the traveling direction of the head, the user data area includes a first non-target area and a first target area aligned in order in the traveling direction of the head, the first non-target area is located between the third area and the first target area in the traveling direction of the head and is adjacent to each of the third area and the first target area, and the controller uses the first target area as a target for reading and writing, and excludes the first non-target area from the target for reading and writing.

6. The magnetic disk device of claim 5, wherein when the third area is adjacent to an outer circumference side of the fourth area, when a direction which is opposite to the traveling direction of the head and in which the disk rotates is referred to as a rotational direction, and when the disk is viewed with reference to the rotational direction, a front end of the first target area is aligned with a rear end of the fourth area in the radial direction or the front end of the first target area is located behind the rear end of the fourth area.

7. The magnetic disk device of claim 3, wherein the disk further includes a user data area adjacent to the servo area in the traveling direction of the head, the user data area includes a second non-target area and a second target area aligned in order in the traveling direction of the head, the second non-target area is located between the fourth area and the second target area in the traveling direction of the head and is adjacent to each of the fourth area and the second target area, and the controller uses the second target area as a target for reading and writing, and excludes the second non-target area from the target for reading and writing.

8. The magnetic disk device of claim 7, wherein when the third area is adjacent to an inner circumference side of the fourth area, when a direction which is opposite to the traveling direction of the head and in which the disk rotates is referred to as a rotational direction, and when the disk is viewed with reference to the rotational direction, a front end of the second target area is aligned with a rear end of the third area in the radial direction or the front end of the second target area is located behind the rear end of the third area.

9. The magnetic disk device of claim 3, wherein the servo area further includes a fifth area of the first servo frequency, the controller demodulates the first servo data of the first area read by the head to derive a position of the head, and demodulates third corrected data of the fifth area read by the head to correct the position of the head, to position the head in association with a predetermined track, the first area and the fifth area are aligned in order in the traveling direction of the head, the first area and the fifth area are adjacent to each other in the circumferential direction of the disk, and the second area and the fifth area are adjacent to each other in the radial direction.

10. The magnetic disk device of claim 9, wherein the disk further includes a user data area adjacent to the servo area in the traveling direction of the head, the user data area includes a third non-target area and a third target area aligned in order in the traveling direction of the head, the third non-target area is located between the fifth area and the third target area in the traveling direction of the head and is adjacent to each of the fifth area and the third target area, and the controller uses the third target area as a target for reading and writing, and excludes the third non-target area from the target for reading and writing.

11. The magnetic disk device of claim 10, wherein when a direction which is opposite to the traveling direction of the head and in which the disk rotates is referred to as a rotational direction and when the disk is viewed with reference to the rotational direction, a front end of the third target area is aligned with a rear end of the third area in the radial direction or the front end of the third target area is located behind the rear end of the third area.

12. The magnetic disk device of claim 3, wherein the disk further includes a user data area adjacent to the servo area in the traveling direction of the head, the user data area includes a first non-target area and a first target area that are adjacent to the third area in the traveling direction of the head and that are aligned in the radial direction, the first non-target area is located between the fourth area and the first target area in the radial direction and is adjacent to each of the fourth area and the first target area, and the controller uses the first target area as a target for reading and writing, and excludes the first non-target area from the target for reading and writing.

13. The magnetic disk device of claim 12, wherein the first non-target area is an area which is influenced when the data is written to the first target area.

14. The magnetic disk device of claim 3, wherein the disk further includes a user data area adjacent to the servo area in the traveling direction of the head, the user data area includes a second non-target area and a second target area that are adjacent to the fourth area in the traveling direction of the head and that are aligned in the radial direction, the second non-target area is located between the third area and the second target area in the radial direction and is adjacent to each of the third area and the second target area, and the controller uses the second target area as a target for reading and writing, and excludes the second non-target area from the target for reading and writing.

15. The magnetic disk device of claim 14, wherein the second non-target area is an area which is influenced when the data is written to the second target area.

16. The magnetic disk device of claim 9, wherein the disk further includes a user data area adjacent to the servo area in the traveling direction of the head, the user data area includes a third non-target area and a third target area that are adjacent to the fifth area in the traveling direction of the head and that are aligned in the radial direction, the third non-target area is located between the second and third areas and the third target area in the radial direction and is adjacent to each of the second area, the third area, and the third target area, and the controller uses the third target area as a target for reading and writing, and excludes the third non-target area from the target for reading and writing.

17. The magnetic disk device of claim 16, wherein the third non-target area is an area which is influenced when the data is written to the third target area.

* * * * *